US011208596B2

(12) United States Patent
Ohno et al.

(10) Patent No.: US 11,208,596 B2
(45) Date of Patent: *Dec. 28, 2021

(54) OPTICAL FILM, POLARIZING PLATE, AND IMAGE DISPLAY DEVICE

(71) Applicant: FUJIFILM Corporation, Tokyo (JP)

(72) Inventors: Takahiro Ohno, Kanagawa (JP); Makoto Ishiguro, Kanagawa (JP); Yoshiaki Hisakado, Kanagawa (JP); Hiroshi Sato, Kanagawa (JP); Keita Takahashi, Kanagawa (JP); Naozumi Shiraiwa, Kanagawa (JP); Taiji Katsumata, Kanagawa (JP); Hiroshi Matsuyama, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/871,311

(22) Filed: May 11, 2020

(65) Prior Publication Data
US 2020/0270524 A1 Aug. 27, 2020

Related U.S. Application Data

(63) Continuation of application No. 15/825,737, filed on Nov. 29, 2017, now Pat. No. 10,689,575, which is a (Continued)

(30) Foreign Application Priority Data

Jun. 3, 2015 (JP) .............................. JP2015-113526
Sep. 30, 2015 (JP) .............................. JP2015-193304

(51) Int. Cl.
C09K 19/38 (2006.01)
G02F 1/13363 (2006.01)
(Continued)

(52) U.S. Cl.
CPC ........ *C09K 19/3823* (2013.01); *C08F 236/20* (2013.01); *C09K 19/3491* (2013.01);
(Continued)

(58) Field of Classification Search
CPC ............ C09K 19/3823; C09K 19/3491; C09K 19/3497; C09K 19/54; C09K 2019/0448;
(Continued)

(56) References Cited

U.S. PATENT DOCUMENTS

2004/0171788 A1 9/2004 Satoh et al.
2015/0043073 A1 2/2015 Sase et al.
(Continued)

FOREIGN PATENT DOCUMENTS

EP 2062882 A1 5/2009
JP 8-136731 A 5/1996
(Continued)

OTHER PUBLICATIONS

International Search Report issued in PCT/JP2016/066360 dated Aug. 16, 2016.
(Continued)

Primary Examiner — Ruiyun Zhang
(74) Attorney, Agent, or Firm — Edwards Neils LLC; Jean C. Edwards, Esq.

(57) ABSTRACT

The present invention is to provide an optical film having optically anisotropic layer having excellent durability, and a polarizing plate and an image display device using the same. An optical film of the present invention is an optical film having at least an optically anisotropic layer, in which the optically anisotropic layer is a layer obtained by polymerizing a polymerizable liquid crystal composition containing a predetermined liquid crystal compound and a polymeriza-
(Continued)

tion initiator, and an extrapolated glass transition starting temperature of the optically anisotropic layer is 70° C. or higher.

9 Claims, 1 Drawing Sheet

Related U.S. Application Data continuation of application No. PCT/JP2016/066360, filed on Jun. 2, 2016.

(51) Int. Cl.
    *C09K 19/54*     (2006.01)
    *C09K 19/34*     (2006.01)
    *G02B 5/30*     (2006.01)
    *C08F 236/20*     (2006.01)
    *C09K 19/04*     (2006.01)
    *G02F 1/1335*     (2006.01)

(52) U.S. Cl.
    CPC .......... *C09K 19/3497* (2013.01); *C09K 19/54* (2013.01); *G02B 5/305* (2013.01); *G02B 5/3016* (2013.01); *G02B 5/3058* (2013.01); *G02B 5/3083* (2013.01); *G02F 1/13363* (2013.01); *C09K 2019/0448* (2013.01); *C09K 2323/00* (2020.08); *C09K 2323/03* (2020.08); *C09K 2323/031* (2020.08); *C09K 2323/035* (2020.08); *G02F 1/133528* (2013.01); *G02F 1/133633* (2021.01); *G02F 1/133637* (2021.01); *G02F 1/133638* (2021.01)

(58) Field of Classification Search
    CPC ............ C09K 2323/00; C09K 2323/03; C09K 2323/031; C09K 2323/035; G02F 1/13363; G02F 1/133528; G02F 1/133633; G02F 1/133637
    USPC .......... 428/1.1, 1.3, 1.31, 1.33; 349/117, 194
See application file for complete search history.

(56) References Cited

U.S. PATENT DOCUMENTS

| | | |
|---|---|---|
| 2015/0079380 A1 | 3/2015 | Muramatsu et al. |
| 2015/0146156 A1* | 5/2015 | Hirai ................ C09K 19/32 349/183 |
| 2015/0175564 A1 | 6/2015 | Sakamoto et al. |
| 2015/0274872 A1 | 10/2015 | Sakamoto et al. |
| 2016/0108315 A1 | 4/2016 | Matsuyama et al. |
| 2016/0131809 A1 | 5/2016 | Takeda et al. |

FOREIGN PATENT DOCUMENTS

| | | |
|---|---|---|
| JP | 2002-363266 A | 12/2002 |
| JP | 2003-193053 A | 7/2003 |
| JP | 2004-143268 A | 5/2004 |
| JP | 2007-279705 A | 10/2007 |
| JP | 2008-191630 A | 8/2008 |
| JP | 2008-250237 A | 10/2008 |
| JP | 2009-275164 A | 11/2009 |
| JP | 2009-286976 A | 12/2009 |
| JP | 2010-031223 A | 2/2010 |
| JP | 2010-152217 A | 7/2010 |
| JP | 2015-038598 A | 2/2015 |
| WO | 2008/072652 A1 | 6/2008 |
| WO | 2014/010325 A1 | 1/2014 |
| WO | 2014/065176 A1 | 5/2014 |
| WO | 2014/132978 A1 | 9/2014 |
| WO | 2014/155521 A1 | 10/2014 |

OTHER PUBLICATIONS

Written Opinion issued in PCT/JP2016/066360 dated Aug. 16, 2016.
International Preliminary Report on Patentability completed by WIPO dated Dec. 14, 2017, in connection with International Patent Application No. PCT/JP2016/066360.
Notification of Reasons for Refusal issued by the Japanese Patent Office dated Oct. 30, 2018, in connection with Japanese Patent Application No. 2017-522236.
Notification of Reasons for Refusal issued by the Japanese Patent Office dated Jul. 9, 2019, in connection with Japanese Patent Application No. 2017-522236.
Non-Final Office Action issued in corresponding Parent U.S. Appl. No. 15/825,737 dated Aug. 23, 2019.
Final Office Action issued in corresponding Parent U.S. Appl. No. 15/825,737 dated Jan. 2, 2020.
Decision of Refusal issued by the Japanese Patent Office dated Mar. 31, 2020, in connection with Japanese Patent Application No. 2017-522236.
Office Action, issued by the Japanese Patent Office dated Jun. 1, 2021, in connection with Japanese Patent Application No. 2020-109307.

* cited by examiner

OPTICAL FILM, POLARIZING PLATE, AND IMAGE DISPLAY DEVICE

CROSS-REFERENCE TO RELATED APPLICATIONS

The present application is a Continuation of U.S. application Ser. No. 15/825,737, filed on Nov. 29, 2017, which is a Continuation of PCT International Application No. PCT/JP2016/066360 filed on Jun. 2, 2016, which was published under PCT Article 21(2) in Japanese, and which claims priority under 35 U.S.C. § 119(a) to Japanese Patent Application No. 2015-113526 filed on Jun. 3, 2015 and Japanese Patent Application No. 2015-193304 filed on Sep. 30, 2015. The above applications are hereby expressly incorporated by reference, in their entirety, into the present application.

BACKGROUND OF THE INVENTION

1. Field of the Invention

The present invention relates to an optical film, a polarizing plate, and an image display device.

2. Description of the Related Art

Optical films such as an optical compensation sheet and a phase difference film are used for various image display devices to eliminate image coloration and to broaden the viewing angle.

Stretched birefringent films have been employed as optical films. However, in recent years, instead of stretched birefringent films, the use of optical films having optically anisotropic layers formed of liquid crystal compounds has been proposed.

As such an optical film, for example, JP2010-031223A discloses an optical film obtained by polymerizing a compound which contains a predetermined group and a polymerizable group ([claim 12]).

SUMMARY OF THE INVENTION

The present inventors have conducted investigations on the optical film disclosed in JP2010-031223A and have found that, in a case in which an optically anisotropic layer to be formed is exposed to a high temperature and high humidity environment, there is a durability problem that the birefringence, index of the optically anisotropic layer changes depending on the polymerization conditions of a polymerizable liquid crystal compound to be used.

Here, an object of the present invention is to provide an optical film having an optically anisotropic layer having excellent durability, and a polarizing plate and an image display device using the same.

As a result of intensive investigations to achieve the above object, the present inventors have found that in a case of using a liquid crystal compound having a predetermined structure, satisfactory durability is obtained by setting the extrapolated glass transition starting temperature of an optically anisotropic layer to be formed to 70° C. or higher and thus have completed the present invention.

That is, it has been found that the above object can be achieved by adopting the following configurations.

[1] An optical film comprising at least: an optically anisotropic layer, in which the optically anisotropic layer is a layer obtained by polymerizing a polymerizable liquid crystal composition containing a liquid crystal compound represented by Formula (1) and a polymerization initiator, and an extrapolated glass transition starting temperature of the optically anisotropic layer is 70° C. or higher.

[2] The optical film according to [1], in which the extrapolated glass transition starting temperature of the optically anisotropic layer is 80° C. or higher.

[3] The optical film according to [1] or [2], in which the polymerization initiator is an oxime type polymerization initiator represented by Formula (2).

[4] The optical film according to any one of [1] to [3], in which the extrapolated glass transition starting temperature of the optically anisotropic layer is 90° C. or higher.

[5] The optical film according to any one of [1] to [4], in which the optically anisotropic layer is a layer obtained by polymerizing the polymerizable liquid crystal composition after aligning the polymerizable liquid crystal composition in a smectic phase.

[6] The optical film according to any one of [1] to [5], in which the polymerizable liquid crystal composition contains one or two kinds of liquid crystal compounds represented by Formula (1) and other polymerizable compounds.

[7] The optical film according to [6], in which the polymerizable compound has 2 to 4 polymerizable groups.

[8] The optical film according to any one of [1] to [7], in which the optically anisotropic layer satisfies Expression (I), $$0.75 \leq Re(450)/Re(550) \leq 1.00 \quad (I)$$

in Expression (I), Re(450) represents an in-plane retardation of the optically anisotropic layer at a wavelength of 450 nm, and Re(550) represents an in-plane retardation of the optically anisotropic layer at a wavelength of 550 nm.

[9] A polarizing plate comprising: the optical film according to any one of [1] to [8]; and a polarizer.

[10] An image display device comprising: the optical film according to any one of [1] to [8]; or the polarizing plate according to [9].

According to the present invention, it is possible to provide an optical film having an optically anisotropic layer having excellent durability, and a polarizing plate and an image display device using the same.

DESCRIPTION OF THE PREFERRED EMBODIMENTS

Hereinafter, the present invention will be described in detail.

The description of the constitutional requirements described below is made on the basis of representative embodiments of the present invention, but it should not be construed that the present invention is limited to those embodiments.

In this specification, numerical value ranges expressed by the term "to" mean that the numerical values described before and after "to" are included as a lower limit and an upper limit, respectively.

[Optical Film]

An optical film of the present invention is an optical film having at least an optically anisotropic layer, the optically anisotropic layer is a layer obtained by polymerizing a polymerizable liquid crystal composition containing a liquid crystal compound represented by Formula (1) and a polymerization initiator, and the extrapolated glass transition starting temperature of the optically anisotropic layer is 70° C. or higher.

The present inventors have found that in a case in which the extrapolated glass transition starting temperature of an optically anisotropic layer formed by using a liquid crystal compound represented by Formula (1) is set to 70° C. or higher as described above, the durability of the optically anisotropic layer becomes satisfactory.

First, an ester bond included in the structure of the liquid crystal compound is present even after polymerization, that is, after the optically anisotropic layer is formed but the present inventors assume that a birefringence index is changed due to a hydrolysis reaction of a hydrolyzable bond such as this ester bond in a high temperature and high humidity environment.

Therefore, in the present invention, by setting the extrapolated glass transition starting temperature of the optically anisotropic layer to be formed to 70° C. or higher, even in a high temperature and high humidity environment, molecular mobility in the optically anisotropic layer is suppressed and as a result, a hydrolysis reaction hardly occurs. Thus, it is considered that the durability is improved. In consideration of the results shown in Comparative Example 2 described later, even in a case in which a liquid crystal compound has an ester bond as a hydrolyzable bond, conjugation systems are connected in a case in which a liquid crystal compound having a structure in which a benzene ring (phenylene group) is bonded to the liquid crystal compound through the ester bond is contained, and thus it is considered that a durability problem hardly arises.

Figure 1A:
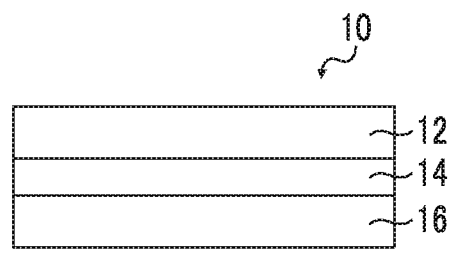
FIG. 1A is a cross-sectional view schematically showing an example of an optical film according to the present invention.
Figure 1B:
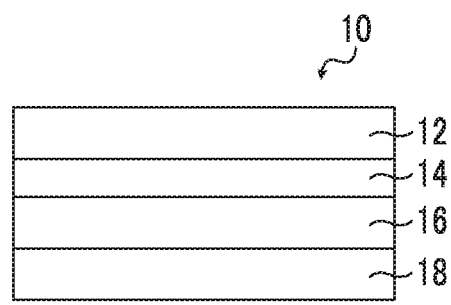
FIG. 1B is a cross-sectional view schematically showing an example of the optical film according to the present invention.
Figure 1C:
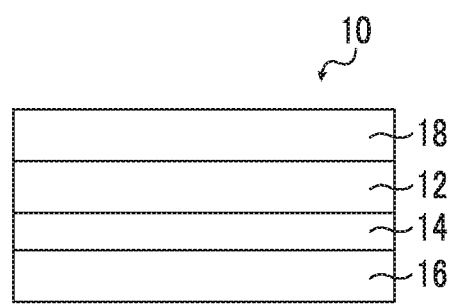
FIG. 1C is a cross-sectional view schematically showing an example of the optical film according to the present invention.

FIGS. 1A to 1C are cross-sectional views schematically showing examples of the optical film according to the present invention, respectively.

FIGS. 1A to 1C are schematic views and the thicknesses relationship and positional relationship between the respective layers or the like do not necessarily coincide with actual ones. Any of the support, alignment film, and hard coat layer shown in FIGS. 1A to 1C is an arbitrary constitutional member.

An optical film 10 shown in FIGS. 1A to 1C has a support 16 an alignment film 14, and an optically anisotropic layer 12 in this order.

In addition, the optical film 10 may have a hard coat layer 18 on the side of the support 16 opposite to the side on which the alignment film 14 is provided as shown in FIG. 1B and may have a hard coat layer 18 on the side of the optically anisotropic layer 12 opposite to the side on which the alignment film 14 is provided as shown in FIG. 1C.

Hereinafter, various members used for the optical film of the present invention will be described in detail,

[Optically Anisotropic Layer]

The optically anisotropic layer of the optical film of the present invention is a layer obtained by polymerizing a polymerizable liquid crystal composition containing a liquid crystal compound represented by Formula (1) and a polymerization initiator, and the extrapolated glass transition starting temperature is 70° C. or higher.

Herein, the extrapolated glass transition starting temperature refers to a value measured under the following conditions using a differential scanning calorimeter (X-DSC7000) manufactured by SII Technology, Inc.

The measurement is performed by putting a sample in aluminum pan in an amount of 2 to 3 mg in a sealed state and performing cooling and heating by the temperature profile shown below in a nitrogen atmosphere, and obtaining the extrapolated glass transition starting temperature from the measurement data at the second heating according to the method of JIS K 7121 9.3.(2), (Temperature Profile)
30° C.→0° C. (cooling at 20° C./min)
0° C.→150° C. (heating at 20° C./min)
150° C.→0° C. (cooling at 20° C./min)
0° C.→150° C. (heating at 20° C./min)

<Liquid Crystal Compound>

The polymerizable liquid crystal composition forming the optically anisotropic layer includes the liquid crystal compound represented by Formula (1).

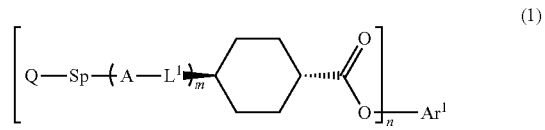

Herein, in Formula (1), $Ar^1$ represents an n-valent aromatic group, $L^1$ represents a single bond, —COO—, or —OCO—, A represents an aromatic ring having 6 or more carbon atoms or a cycloalkylene ring having 6 or more carbon atoms, Sp represents a single bond, a linear or branched alkylene group having 1 to 12 carbon atoms, or a divalent linking group in which one or more —$CH_2$— groups that constitute a linear or branched alkylene group having 1 to 12 carbon atoms are substituted with —O—, —S—, —NH—, —N(Q)-, or —CO—, and Q represents a polymerizable group, m represents an integer of 0 to 2, and n represents an integer of 1 or 2.

Herein, all of L, A, Sp, and Q, a plurality of which are provided depending on the number of m or n, may be the same or different from each other.

In Formula (1), an aromatic group represented by $Ar^1$ refers to a group having a ring having aromaticity and for example, an n-valent group having at least one aromatic ring selected from the group consisting of an aromatic hydrocarbon ring and an aromatic heterocyclic ring may be used. Herein, examples of the aromatic hydrocarbon ring include a benzene ring, a naphthalene ring, an anthracene ring, and a phenanthroline ring, and examples of the aromatic heterocyclic ring include a furan ring, a pyrrole ring, a thiophene ring, a pyridine ring, a thiazole ring, and a benzothiazole ring. Among these, a benzene ring, a thiazole ring, and a benzothiazole ring are preferable.

In addition, in Formula (1), examples of an aromatic ring having 6 or more carbon atorns represented by A includes the examples of the aromatic ring included in $Ar^1$ described above, and among these, a benzene ring (for example, 1,4-phenyl group) is preferable. Similarly, in Formula (1), examples of a cycloalkylene ring having 6 or more carbon atoms represented by A include a cyclohexane ring, and a cyclohexane ring. Among these, a cyclohexane ring (for example, cyclohexane-1,4-diyl group) is preferable.

Further, in Formula (1), examples of a polymerizable group represented by Q include a (meth)acryloyl group, a vinyl group, a styryl group, and an allyl group. The term "(meth) acryloyl group" refers to an acryloyl group or a methacryloyl group.

In the present invention, the liquid crystal compound represented by Formula (1) is preferably a compound having at least three ring structures selected from the group consisting of a benzene ring and a cyclohexane ring for the reason that smectic properties are easily exhibited by pseudo phase separation of the rigid mesogenic moiety and the flexible side chain and sufficient rigidity is exhibited.

In the present invention, as the liquid crystal compound represented by Formula (1), for the reason for further improving the durability of the optically anisotropic layer, a compound having two or more polymerizable groups (for example, (meth) acryloyl group, vinyl group, styryl group, and allyl group) is preferable.

Further, in the present invention, the liquid crystal compound represented by Formula (1) is preferably a liquid crystal compound exhibiting reverse wavelength dispersion.

Herein, in this specification, the liquid crystal compound exhibiting "reverse wavelength dispersion" means that at the time of measurement of an in-plane retardation (Re) value at a specific wavelength (visible light range) of a phase difference film prepared using the liquid crystal compound, as the measurement wavelength increases, the Re value becomes equal or higher.

As the liquid crystal compound exhibiting reverse wavelength dispersion, $Ar^1$ in Formula (1) is preferably a compound which is a divalent aromatic ring group represented by Formula (II-1), (II-2), (II-3), or (II-4).

Formula

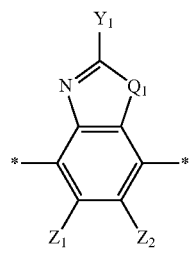
(II-1)

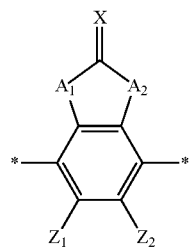
(II-2)

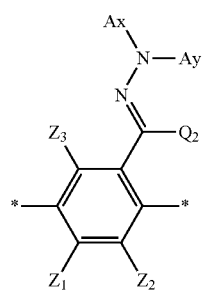
(II-3)

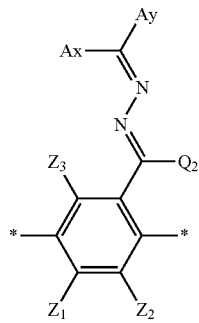
(II-4)

In Formulae (II-1) to (II-4). $Q_1$ represents —S—, —O—, or —$NR^{11}$—, $R^{11}$ represents a hydrogen atom or an alkyl group having 1 to 6 carbon atoms, $Y_1$ represents an aromatic hydrocarbon group having 6 to 12 carbon atoms or an aromatic heterocyclic group having 3 to 12 carbon atoms (the aromatic hydrocarbon group and the aromatic heterocyclic group may have a substituent), $Z_1$, $Z_1$, and $Z_3$ each independently represent a hydrogen atom, an aliphatic hydrocarbon group having 1 to 20 carbon atoms, an alicyclic hydrocarbon group having 3 to 20 carbon atoms, a monovalent aromatic hydrocarbon group having 6 to 20 carbon atoms, a halogen atom, a cyano group, a nitro group, —$NR^{12}R^{13}$, or —$SR^{12}$, $Z_1$ and $Z_2$ may be bonded to each other to form an aromatic ring or an aromatic heterocyclic ring, and $R^{12}$ and $R^{13}$ each independently represent a hydrogen atom or an alkyl group having 1 to 6 carbon atoms, $A_1$ and $A_2$ each independently represent a group selected from the group consisting of —O—, —$NR^{21}$—, —S—, and —CO—, $R^{21}$ represents a hydrogen atom or a substituent, X represents a hydrogen atom or a non-metal atom of Groups 14 to 16 to which a substituent may be bonded (preferable examples thereof include —O—, —S—, =NR', and =C(R')R' (herein, R' represents a substituent)), Ax represents an organic group having 2 to 30 carbon atoms and having at least one aromatic ring selected from the group consisting of an aromatic hydrocarbon ring and aromatic heterocyclic ring, preferably represents an aromatic hydrocarbon ring group; an aromatic heterocyclic group; an alkyl group having 3 to 20 carbon atoms and having at least one aromatic ring selected from the group consisting of an aromatic hydrocarbon ring and an aromatic heterocyclic ring; and an alkenyl group having 3 to 20 carbon atoms and having at least one aromatic ring selected from the group consisting of an aromatic hydrocarbon ring and an aromatic heterocyclic ring, Ay represents a hydrogen atom, an alkyl group having 1 to 6 carbon atoms which may have a substituent, or an organic group having 2 to 30 carbon atoms having at least one aromatic ring selected from the group consisting of an aromatic hydrocarbon ring and an aromatic heterocyclic ring, and preferable embodiments of the organic group are the same as the above preferable embodiments of the organic group of Ax, the aromatic rings in Ax and Ay may respectively have a substituent or Ax and Ay may be bonded to form a ring, and $Q_2$ represents a hydrogen atom, or an alkyl group having 1 to 6 carbon atoms which may have a substituent.

Examples of the substituent include a halogen atom, an alkyl group, halogenated alkyl group, an alkenyl group, an aryl group, a cyano group, an amino group, a nitro group, a nitroso group, a carboxy group, an alkylsulfinyl group having 1 to 6 carbon atoms, an alkylsulfonyl group having 1 to 6 carbon atoms, a fluoroalkyl group having 1 to 6 carbon atoms, an alkoxy group having 1 to 6 carbon atoms, an alkylsulfanyl group having 1 to 6 carbon atoms, a N-alkylamino group having 1 to 6 carbon atoms, a N,N-dialkylarnino group having 2 to 12 carbon atoms, a N-alkylsulfamoyl group having 1 to 6 carbon atoms, a N,N-dialkylsulfamoyl group having 2 to 12 carbon atoms, and a group formed by a combination thereof.

Preferable examples of the liquid crystal compounds represented by Formulae (II-1) to (II-4) are as shown below. However, the present invention is not limited to these liquid crystal compounds.

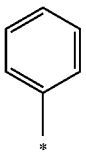

| No | $Y_1$ | n |
|---|---|---|
| II-1-1 | 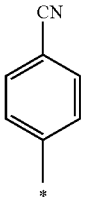 | 6 |
| II-1-2 | CN 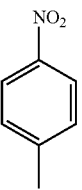 | 6 |
| II-1-3 | NO$_2$ 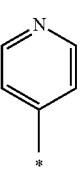 | 6 |
| II-1-4 | 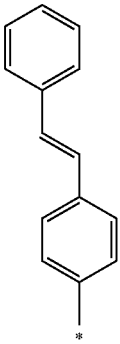 | 6 |
| II-1-5 |  | 6 |

-continued
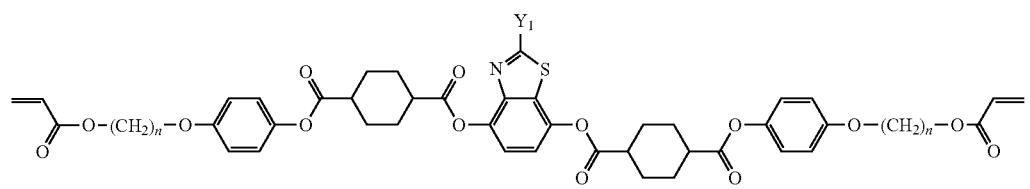
| No | Y1 | n |
|---|---|---|
| II-1-6 | 4-nitrophenyl | 11 |
| II-1-7 | 4-nitrophenyl | 8 |
| II-1-8 | 4-nitrophenyl | 4 |
| II-1-9 | thiophen-2-yl | 6 |
| II-1-10 | 3-methyl-4-nitrophenyl | 6 |
| II-1-11 | 4,6-dimethylbenzofuran-2-yl | 6 |

-continued
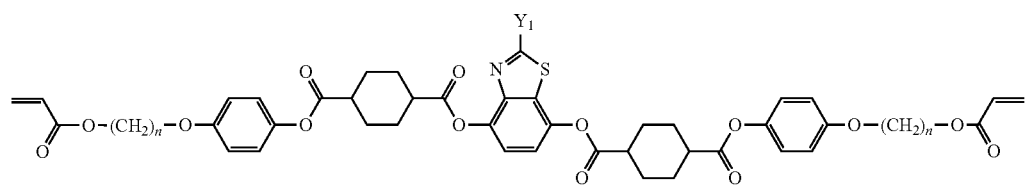
| No | Y1 | n |
|---|---|---|
| II-1-12 | 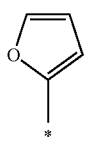 | 6 |
| II-1-13 | 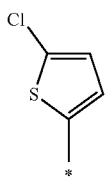 | 6 |
| II-1-14 | 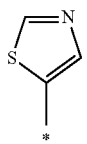 | 6 |
| II-1-15 | 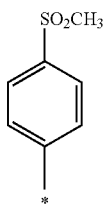 | 6 |
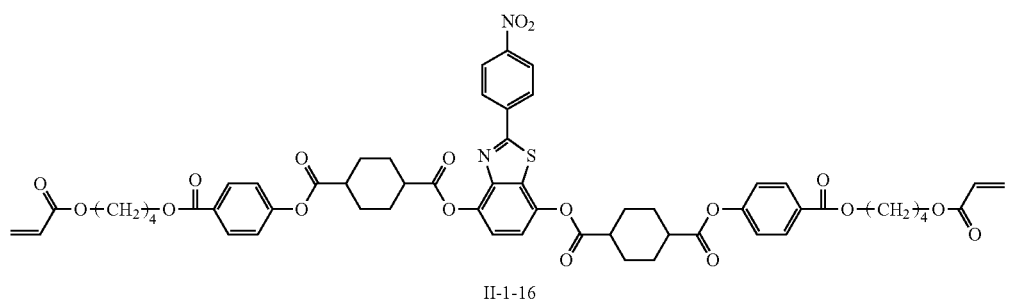 [SMILES: C=CC(=O)OCOC(=O)c1ccc(OC(=O)C2CCC(C(=O)Oc3ccc(OC(=O)C4CCC(C(=O)Oc5ccc(C(=O)OCOC(=O)C=C)cc5)CC4)c4sc(-c5ccc([N+](=O)[O-])cc5)nc34)CC2)cc1]
II-1-16
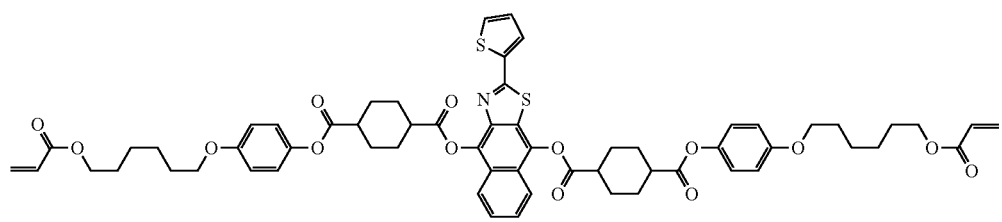
II-1-17

-continued
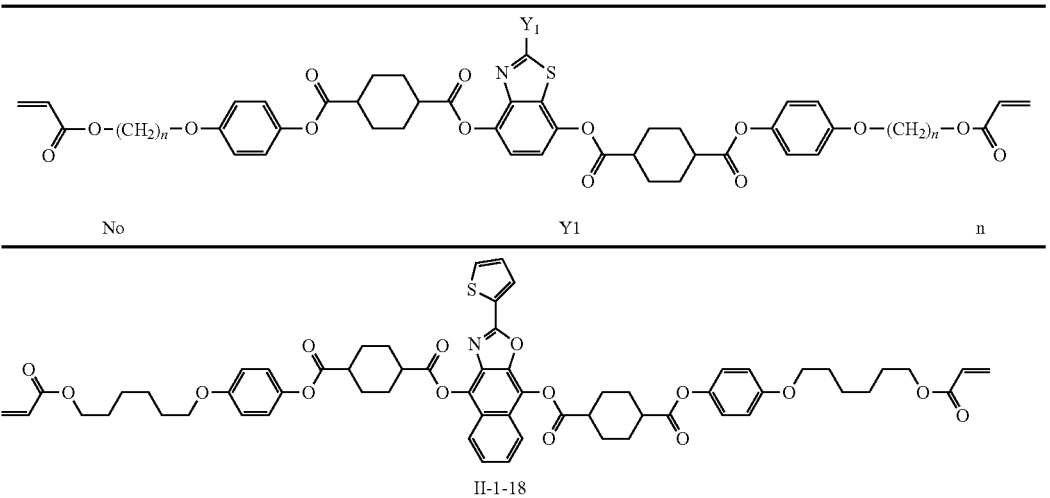
| No | Y1 | n |
|----|----|---|
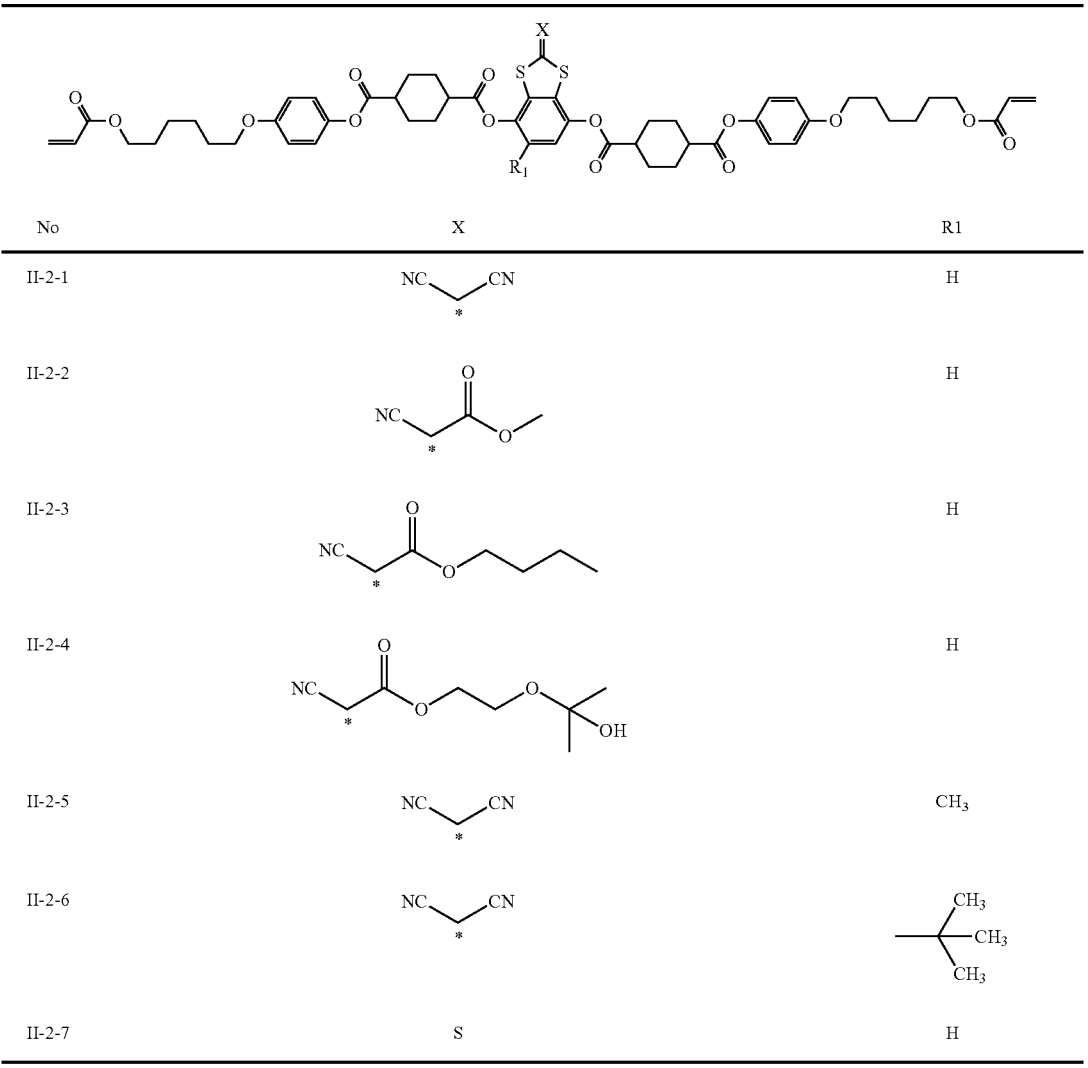
II-1-18
| No | X | R1 |
|----|---|-----|
| II-2-1 | NC–CH(*)–CN | H |
| II-2-2 | NC–CH(*)–C(=O)–O–CH₃ | H |
| II-2-3 | NC–CH(*)–C(=O)–O–butyl | H |
| II-2-4 | NC–CH(*)–C(=O)–O–CH₂CH₂–O–C(CH₃)₂–OH | H |
| II-2-5 | NC–CH(*)–CN | CH₃ |
| II-2-6 | NC–CH(*)–CN | C(CH₃)₃ |
| II-2-7 | S | H |
In the formulae, "*" represents a bonding position.

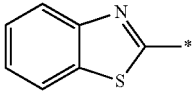 [SMILES: *c1nc2ccccc2s1]
| No | Ax | Ay | Q2 |
|---|---|---|---|
| II-3-1 | 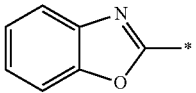 [SMILES: *c1nc2ccccc2o1] | H | H |
| II-3-2 | 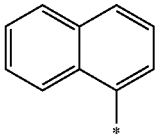 | H | H |
| II-3-3 | 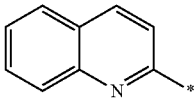 [SMILES: *c1ccc2ccccc2n1] | H | H |
| II-3-4 | Ph | Ph | H |
| II-3-5 | 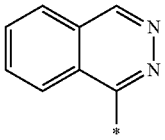 | H | H |
| II-3-6 | 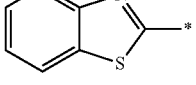 | H | H |
| II-3-7 | 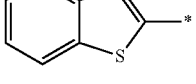 | $CH_3$ | H |
| II-3-8 | 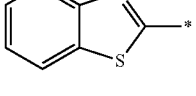 | $C_4H_9$ | H |
| II-3-9 | 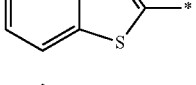 | $C_6H_{13}$ | H |
| II-3-10 | 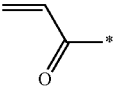 [SMILES: *C(=O)C=C] | 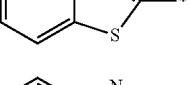 | H |
| II-3-11 | 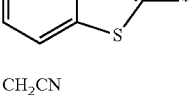 | 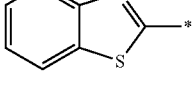 | H |
| II-3-12 |  | $CH_2CN$ | H |

-continued

| No | Ax | Ay | Q2 |
|---|---|---|---|
| II-3-13 | benzothiazol-2-yl | cyclohexyl | H |
| II-3-14 | benzothiazol-2-yl | isobutyl (*-CH$_2$CH$_2$CH(CH$_3$)$_2$... 3-methylbutyl) | H |
| II-3-15 | benzothiazol-2-yl | CH$_2$CH$_2$OH | H |
| II-3-16 | fluoren-9-yl | H | H |
| II-3-17 | benzothiazol-2-yl | CH$_2$CF$_3$ | H |
| II-3-18 | benzothiazol-2-yl | H | CH$_3$ |
| II-3-19 | benzothiazol-2-yl | cyclohexylmethyl | H |
| II-3-20 | benzothiazol-2-yl | *-(CH$_2$)$_3$-CN | H |
| II-3-21 | benzothiazol-2-yl | benzyl | H |
| II-3-22 | benzothiazol-2-yl | *-SO$_2$-C$_6$H$_4$-CH$_3$ (p-tolylsulfonyl) | H |
| II-3-23 | benzothiazol-2-yl | *-CH$_2$-O-CH$_2$CH$_2$-O-CH$_3$ | H |
| II-3-24 | benzothiazol-2-yl | *-C(=O)-CH$_2$CH$_2$CH$_3$ | H |

-continued
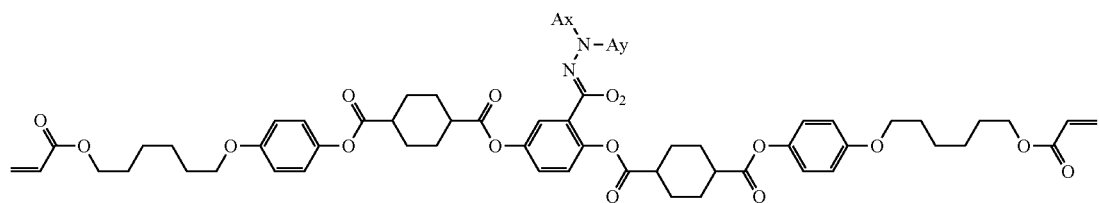
| No | Ax | Ay | Q2 |
|---|---|---|---|
| II-3-25 | 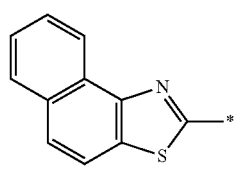 [SMILES: *c1nc2c(ccc3ccccc32)s1] | C₆H₁₃ | H |
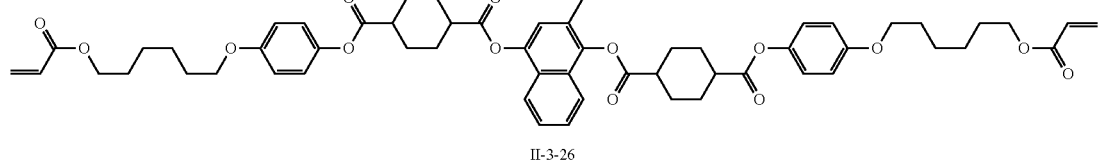
II-3-26
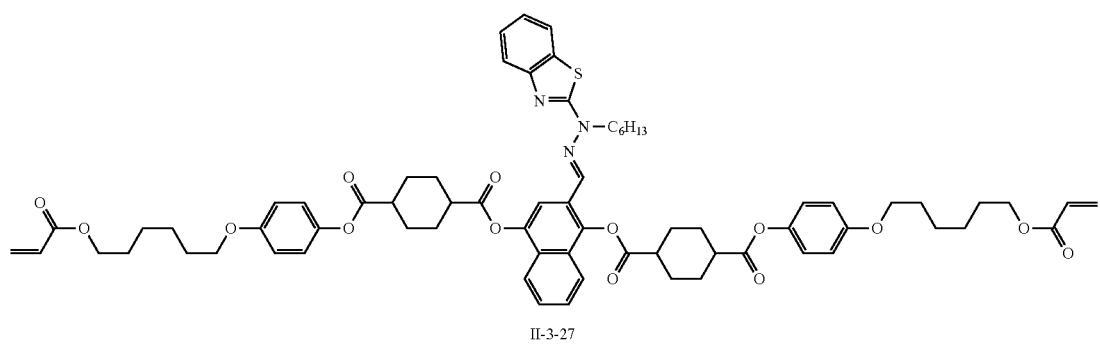
II-3-27
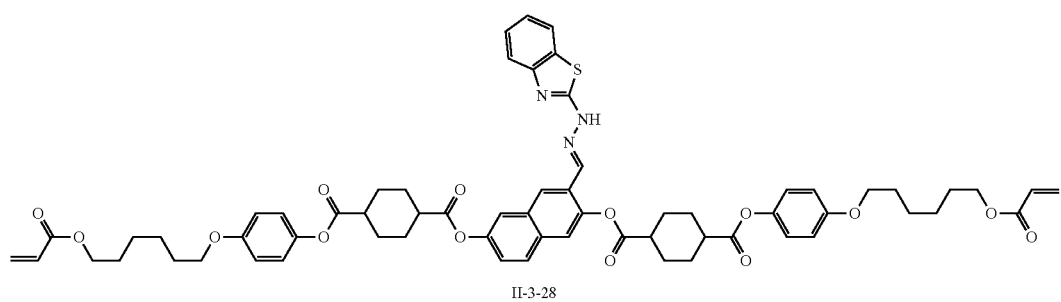 [SMILES: C=CC(=O)OCCCCCCOc1ccc(OC(=O)C2CCC(C(=O)Oc3ccc4cc(OC(=O)C5CCC(C(=O)Oc6ccc(OCCCCCCOC(=O)C=C)cc6)CC5)c(/C=N/Nc5nc6ccccc6s5)cc4c3)CC2)cc1]
II-3-28

-continued
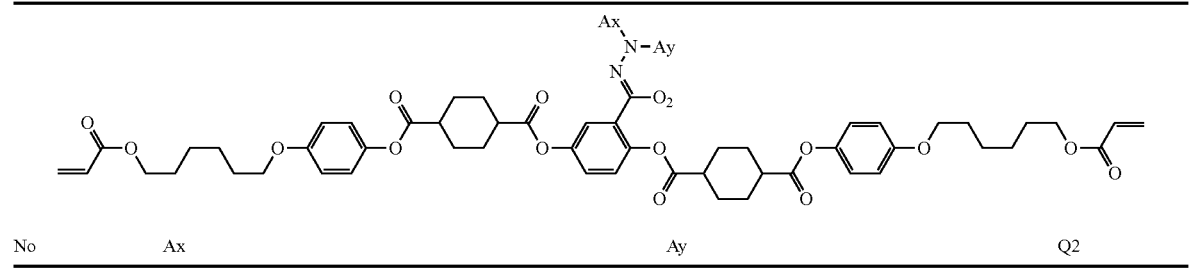
| No | Ax | Ay | Q2 |
|---|---|---|---|
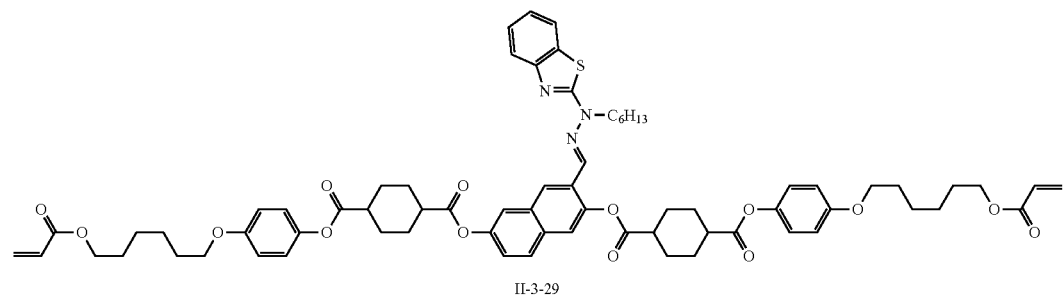
II-3-29
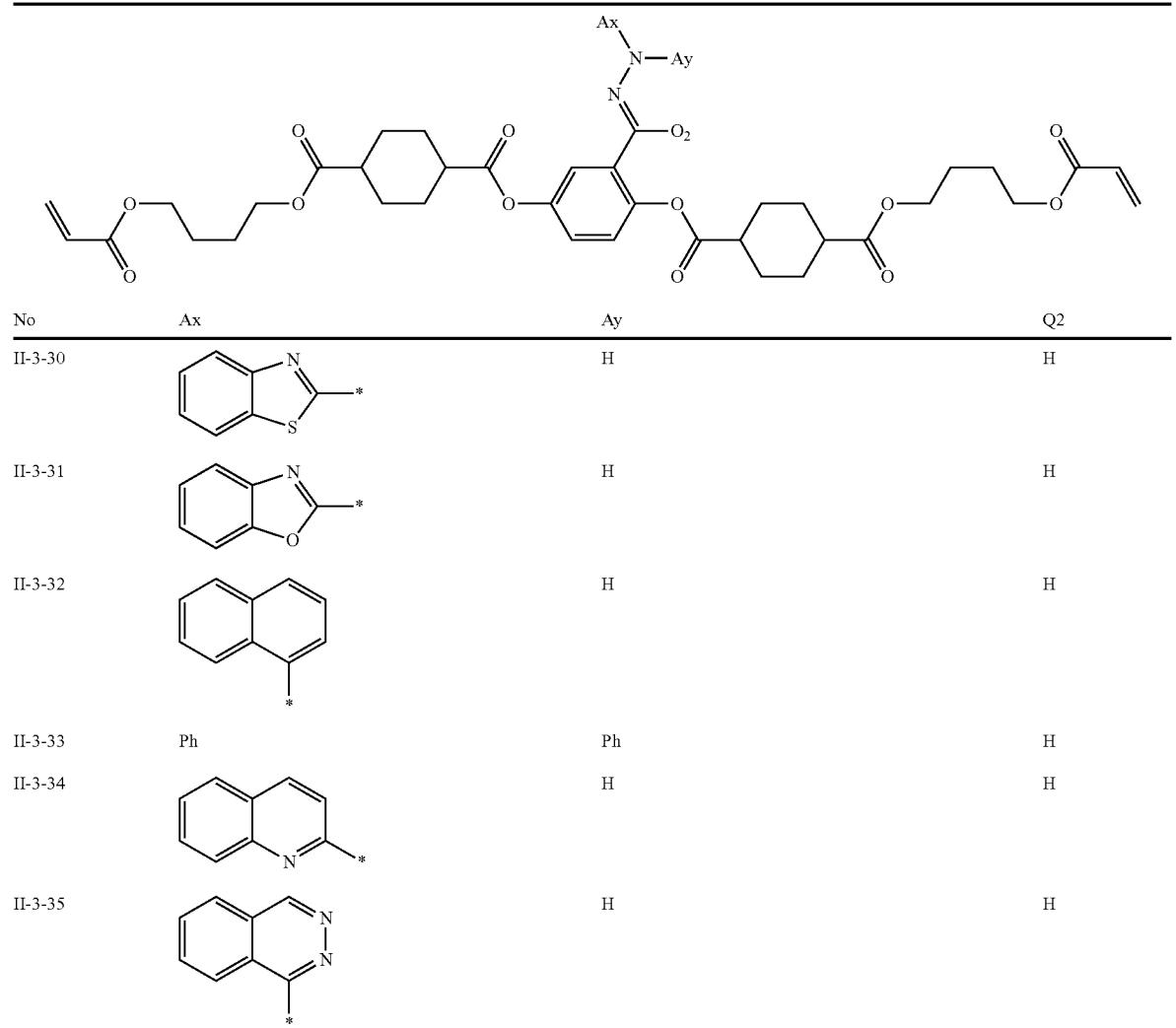
| No | Ax | Ay | Q2 |
|---|---|---|---|
| II-3-30 | benzothiazol-2-yl | H | H |
| II-3-31 | benzoxazol-2-yl | H | H |
| II-3-32 | naphthalen-1-yl | H | H |
| II-3-33 | Ph | Ph | H |
| II-3-34 | quinolin-2-yl | H | H |
| II-3-35 | phthalazin-1-yl | H | H |

-continued

| No | Ax | Ay | Q2 |
|---|---|---|---|
| II-3-36 | benzothiazol-2-yl | CH$_3$ | H |
| II-3-37 | benzothiazol-2-yl | C$_4$H$_9$ | H |
| II-3-38 | benzothiazol-2-yl | C$_6$H$_{13}$ | H |
| II-3-39 | benzothiazol-2-yl | acryloyl | H |
| II-3-40 | benzothiazol-2-yl | benzothiazol-2-yl | H |
| II-3-41 | benzothiazol-2-yl | CH$_2$CN | H |
| II-3-42 | benzothiazol-2-yl | cyclohexyl | H |
| II-3-43 | benzothiazol-2-yl | isobutyl | H |
| II-3-44 | benzothiazol-2-yl | CH$_2$CH$_2$OH | H |
| II-3-45 | fluoren-9-yl | H | H |
| II-3-46 | benzothiazol-2-yl | CH$_2$CF$_3$ | H |

-continued
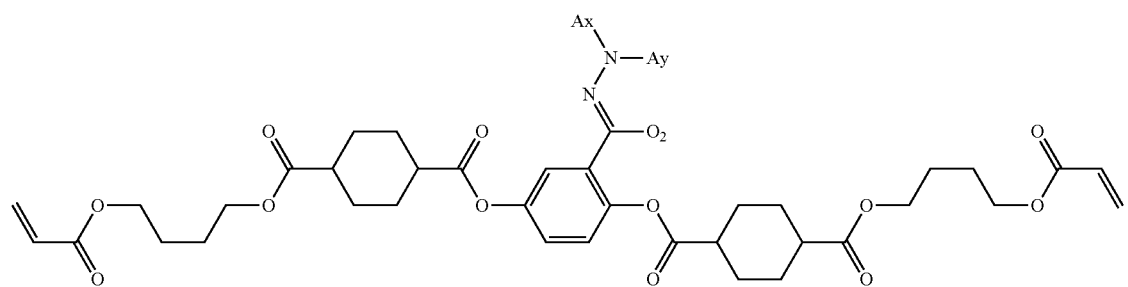
| No | Ax | Ay | Q2 |
|---|---|---|---|
| II-3-47 | benzothiazol-2-yl | H | CH₃ |
| II-3-48 | benzothiazol-2-yl | cyclohexylmethyl | H |
| II-3-49 | benzothiazol-2-yl | *-(CH₂)₃-CN | H |
| II-3-50 | benzothiazol-2-yl | benzyl | H |
| II-3-51 | benzothiazol-2-yl | *-SO₂-C₆H₄-CH₃ | H |
| II-3-52 | benzothiazol-2-yl | *-CH₂-O-CH₂CH₂-O-CH₃ | H |
| II-3-53 | benzothiazol-2-yl | CH₃CH₂CH₂-C(=O)-* | H |
| II-3-54 | naphtho[1,2-d]thiazol-2-yl | C₆H₁₃ | H |

-continued
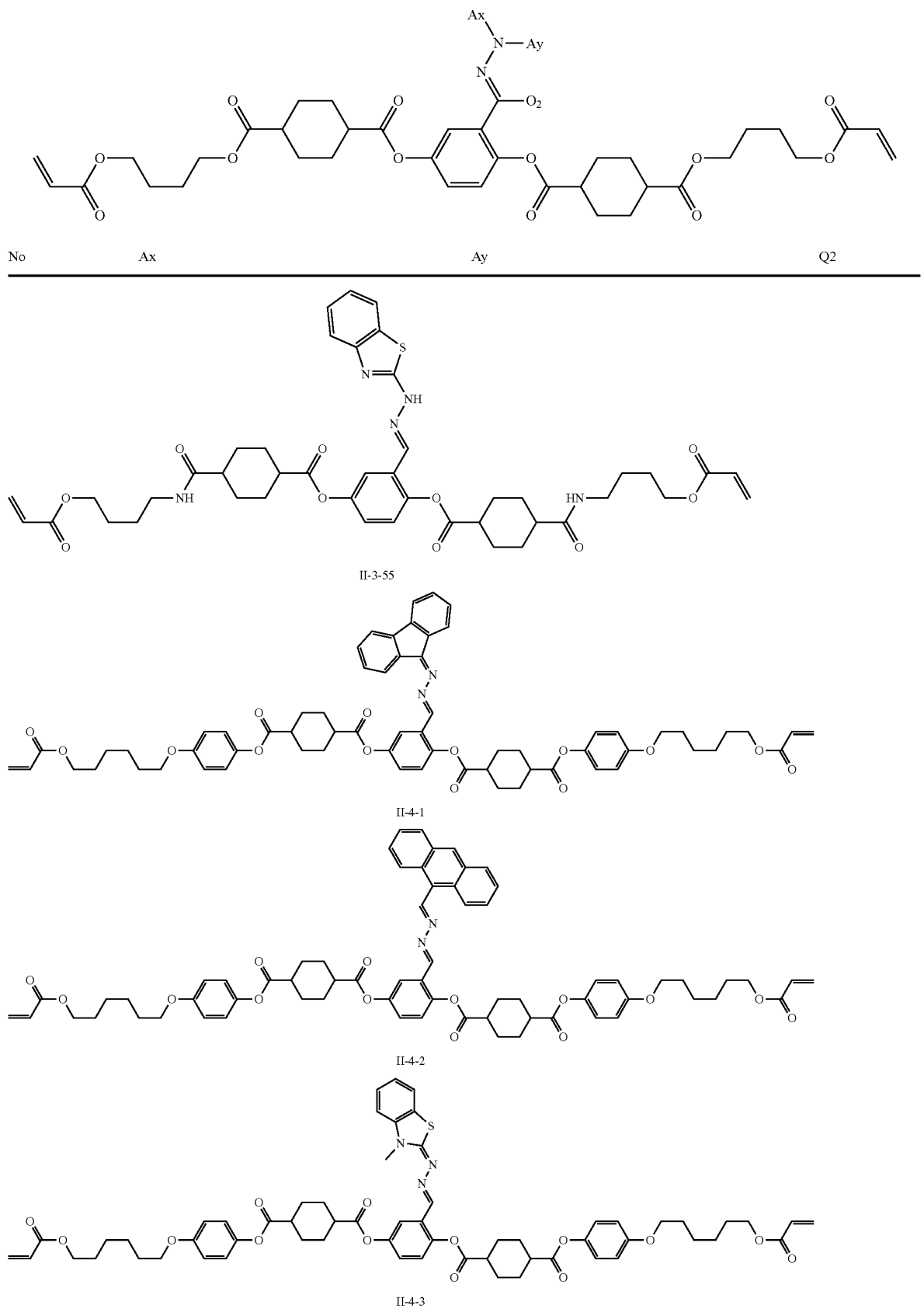
| No | Ax | Ay | Q2 |
|---|---|---|---|

Further, in the present invention, as the liquid crystal compound represented by Formula (1), for the reason for further improving the durability of the optically anisotropic layer by electronic interaction between liquid crystal molecules, to $Ar^1$ in Formula (1) is preferably a compound represented by Formula (II-2). Specifically, it is more preferable that n in Formula (1) is 2 and $Ar^1$ is a compound represented by Formula (1a),

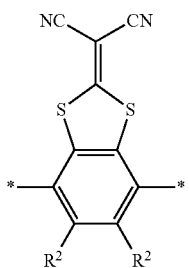

(1a)

Herein, in Formula (1a), * represents a bonding position, and $R^2$'s each independently represent a hydrogen atom or an alkyl group having 1 to 6 carbon atoms.

Examples of a compound in which n in Formula (1) is 2 and $Ar^1$ is a compound represented by Formula (1a) include a compound represented by Formula L-1, and a compound represented by Formula L-2. Further, examples thereof include the compound represented by Formula L-1 (liquid crystal compound L-1), the compound represented by Formula L-2 (liquid, crystal compound L-2), a compound represented by Formula L-3 (liquid crystal compound L-3), a compound represented by Formula L-4 (liquid crystal compound L-4), and a compound represented by Formula L-5 (liquid crystal compound L-5). A group adjacent to an acryloyl oxy group in Formulae L-1 and L-2 represents a propylene group (a group in which a methyl group is substituted with an ethylene group), and the liquid crystal compounds L-1 and L-2 represent mixtures of positional isomers in which the positions of methyl group are different.

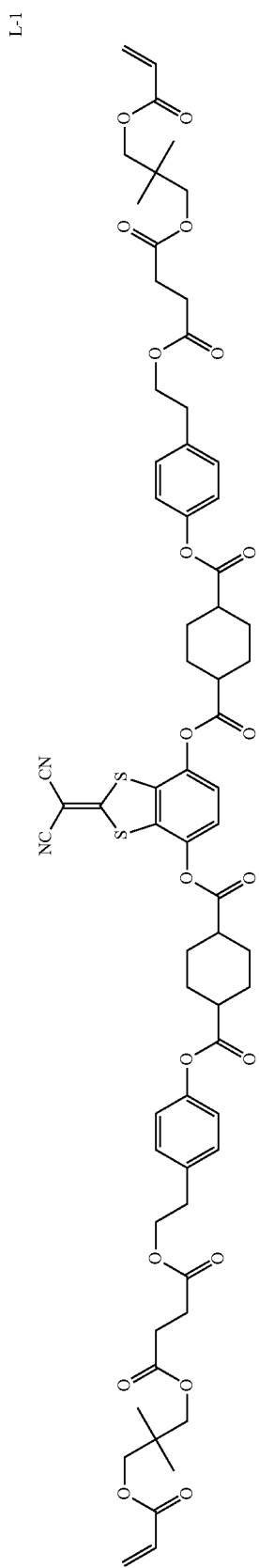
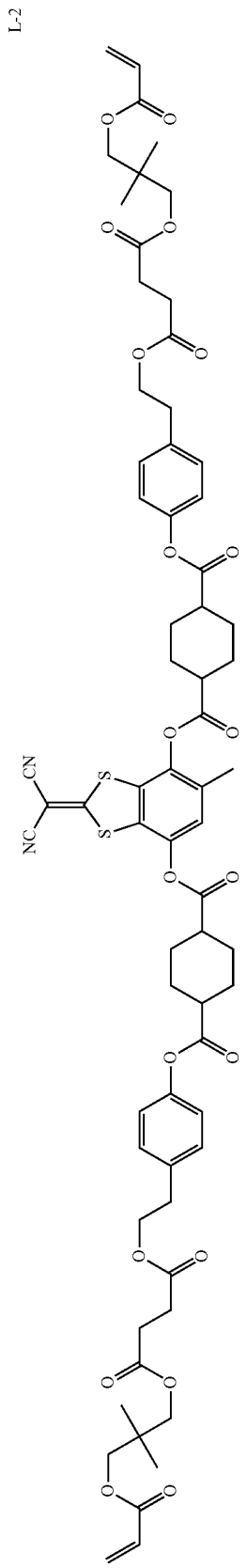
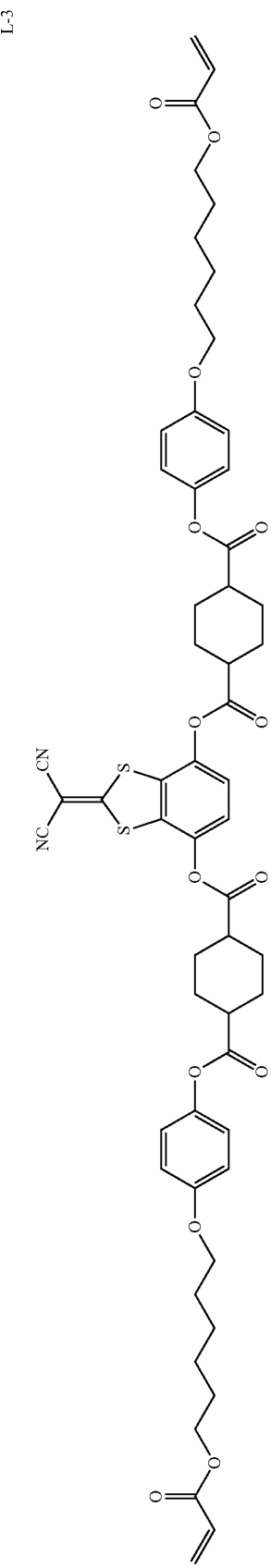

-continued
L-4
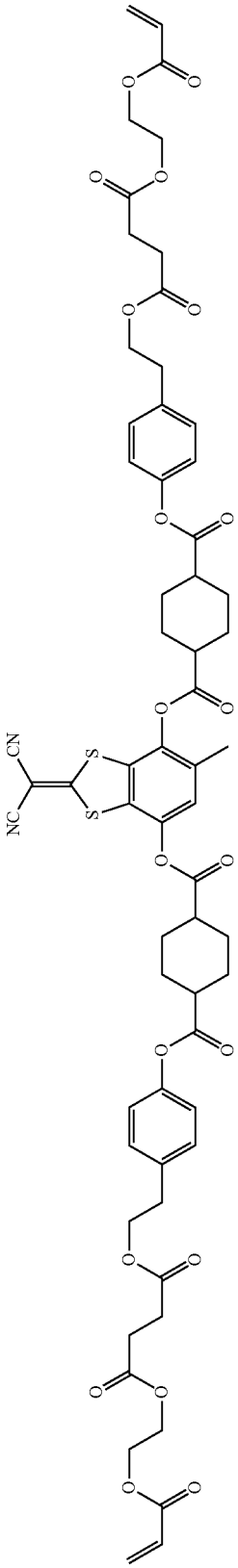
L-5
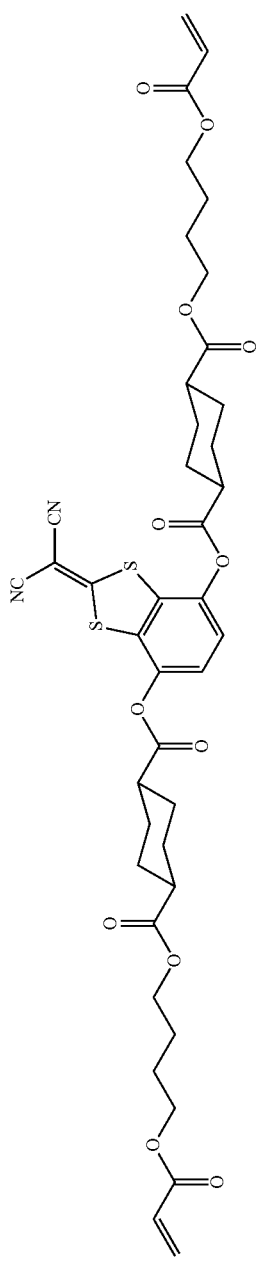

<Polymerization Initiator>

The polymerizable liquid crystal composition forming the optically anisotropic layer includes a polymerization initiator.

The polymerization initiator to be used is preferably a photopolymerization initiator that can initiate a polymerization reaction by irradiation with ultraviolet rays.

Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), multinuclear quinone compounds (as described in U.S. Pat. Nos. 3,046,127A and 2,951,758A), combinations of tri-arylimidazole dimer and p-aminophenyl ketone (as described in U.S. Pat. No. 3,549,367A), acridine and phenazine compounds (described in JP1985-105667A (JP-S60-105667A) and U.S. Pat. No. 4,239,850A), oxadiazole compounds (described in U.S. Pat. No. 4,212,970A), and acyl phosphine oxide compounds (described in JP1988-40799B (JP-S63-40799B), JP1993-29234B (JP-H05-29234B), JP1998-95788A (JP-H10-95788A), and JP1998-29997A (JP-H10-29997A)).

In the present invention, for the reason for further improving the durability of the optically anisotropic layer, the polymerization initiator is preferably an oxime type polymerization initiator represented by Formula (2). This is assumed that since the molecule size of an alkyl radical to be formed is small and the movement of the radical in a layer in which polymerization proceeds is easy, the oxime type polymerization initiator can effectively attack the remaining double bond, the polymerization degree is increased and thus the extrapolated glass transition starting temperature can be increased.

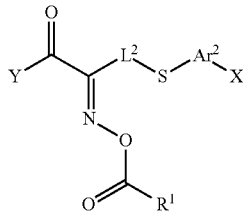

(2)

Herein, in Formula (2), X represents a hydrogen atom or a halogen atom, and

Ar² represents a divalent aromatic group, L² represents a divalent organic group having 1 to 12 carbon atoms, R¹ represents an alkyl group having 1 to 12 carbon atoms, and Y represents a monovalent organic group.

In Formula (2), examples of the halogen atom represented by X include a fluorine atom, a chlorine atom, a bromine atom, and an iodine atom, and among them, a chlorine atom is preferable.

In addition, as the divalent aromatic group represented by Ar² in Formula (2), a divalent group having at least one aromatic ring selected from the group consisting of the aromatic hydrocarbon ring and the aromatic heterocyclic ring exemplified as Ar¹ in Formula (1) may be used.

In addition, examples of the divalent organic group in Formula (2), having 1 to 12 carbon atoms represented by L² include a linear or branched alkylene group having 1 to 12 carbon atoms. Specifically, a methylene group, an ethylene group, a propylene group, and the like may be suitably used.

In addition, in Formula (2), specifically suitable examples of the alkyl group having 1 to 12 carbon atoms represented by R¹ includes a methyl group, an ethyl group, and a propyl group.

Further, in Formula (2), examples of the monovalent organic group represented by Y include functional groups including a benzophenone skeleton ((C₆H₅)₂CO). Specifically, like the groups represented by Formulae (2a) and (2b), functional groups including a benzophenone skeleton in which a benzene ring at terminal is unsubstituted or has one substituent are preferable.

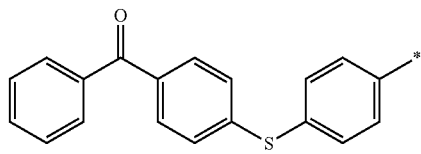

(2a)

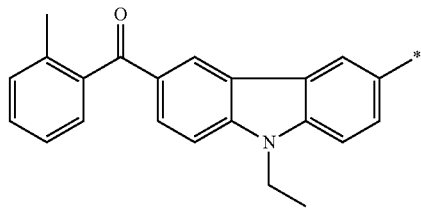

(2b)

Herein, in Formulae (2a) and (2b), * represents a bonding position, that is, a bonding position with the carbon atom of the carbonyl group in Formula (2).

Examples of the oxime type polymerization initiator represented by Formula (2) include a compound represented by Formula S-1 and a compound represented by Formula S-2.

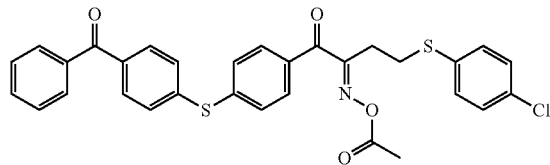

S-1

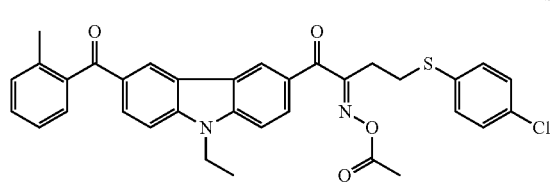

S-2

In the present invention, the content of the polymerization initiator is not particularly limited. However, the solid content of the polymerizable liquid crystal composition is preferably 0.01% to 20% by mass and more preferably 0.5% to 5% by mass.

<Polymerizable Compound>

The polymerizable liquid crystal composition forming the optically anisotropic layer may include other polymerizable compounds in addition to one or two kinds of liquid crystal compounds represented by Formula (1).

Herein, the polymerizable group of the polymerizable compound is not particularly limited and examples thereof include a (meth)acryloyl group, a vinyl group, a styryl group, and an allyl group. Among these, the polymerizable compound preferably has a (meth)acryloyl group.

Other polyimerizable compounds may be the liquid crystal compounds represented by Formula (1). In a case in which other polymerizable compounds are the liquid crystal compounds represented by Formula (1), the polymerizable liquid crystal composition may contain two or three or more kinds of polymerizable compounds represented by Formula (1). For example, the polymerizable liquid crystal composition contains a compound A-39 described later or the like together with the above-described liquid crystal compound L-1 and liquid crystal compound L-2.

In the present invention, for the reasons for further increasing the extrapolated glass transition starting temperature of the optically anisotropic layer and further improving the durability of the optically anisotropic layer, a polymerizable compound having 2 to 4 polymerizable groups is preferable, and a polymerizable compound having two polymerizable groups is more preferable.

Such a polymerizable compound is preferably a liquid crystal compound exhibiting forward wavelength dispersion. Specifically, examples thereof include compounds represented by Formulae A-1 to A-27 and A-29 to A-43.

In addition, examples of the polymerizable compound include compounds represented by Formulae (M1), (M2), and (M3) described in paragraphs [0030] to [0033] of JP2014-077068A and specific examples thereof include specific examples described in paragraphs [0046] to [0055] of JP2014-077068A.

Herein, the term liquid crystal compound exhibiting "forward wavelength dispersion" used in this specification means that at the time of measurement of an in-plane retardation (Re) value at a specific wavelength (visible light range) of a phase difference film prepared using the liquid crystal compound, as the measurement wavelength increases, the Re value becomes equal or higher.

A-1
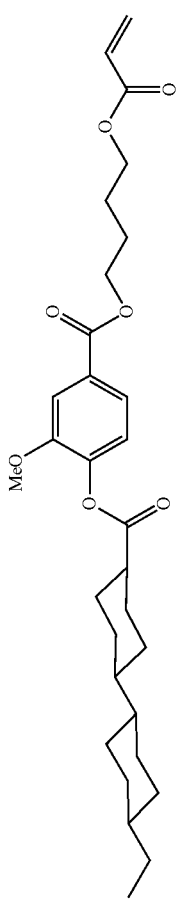
A-2
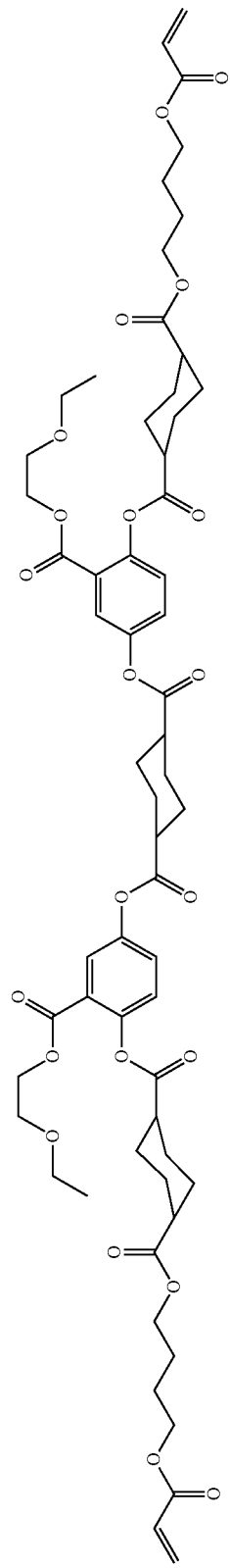
A-3
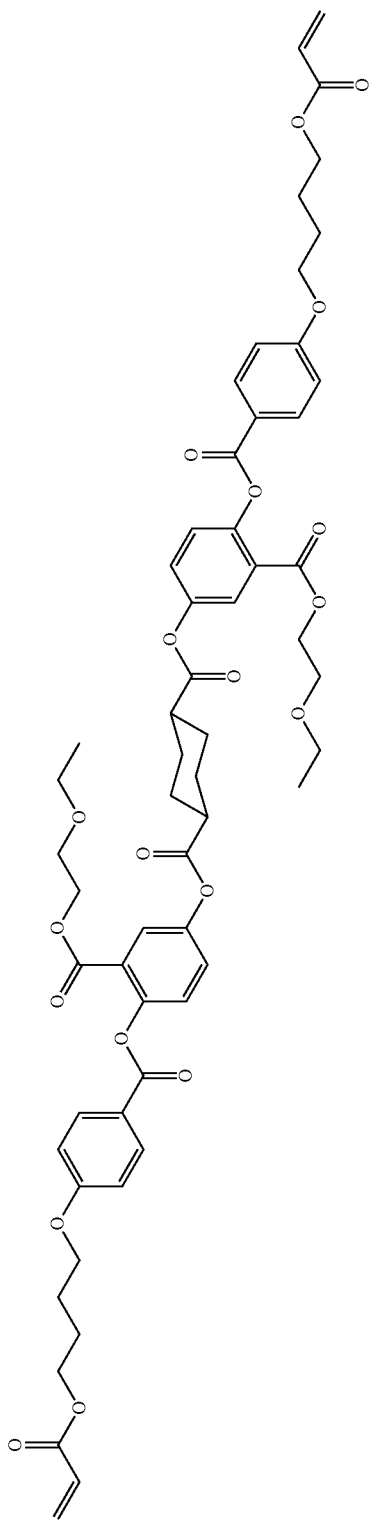

-continued
A-4
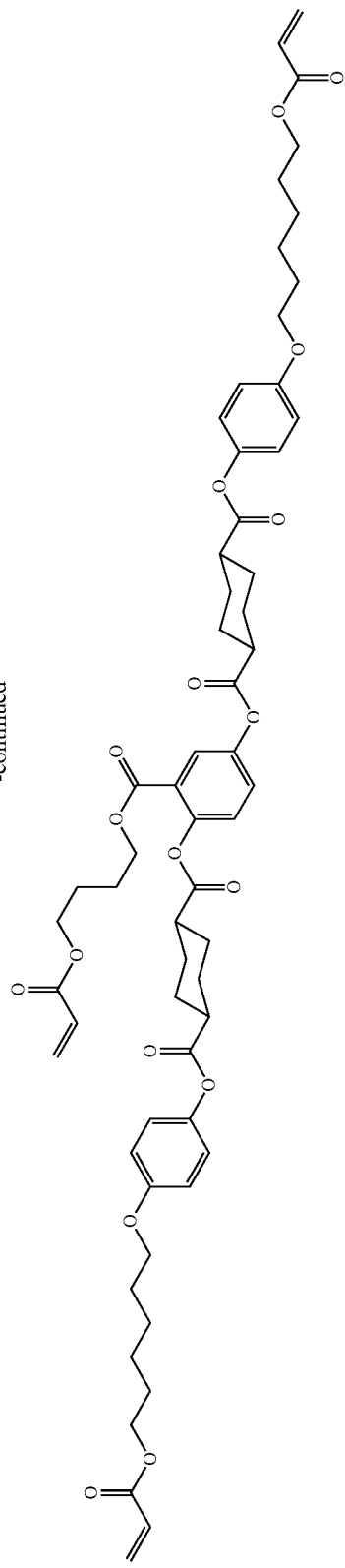
A-5
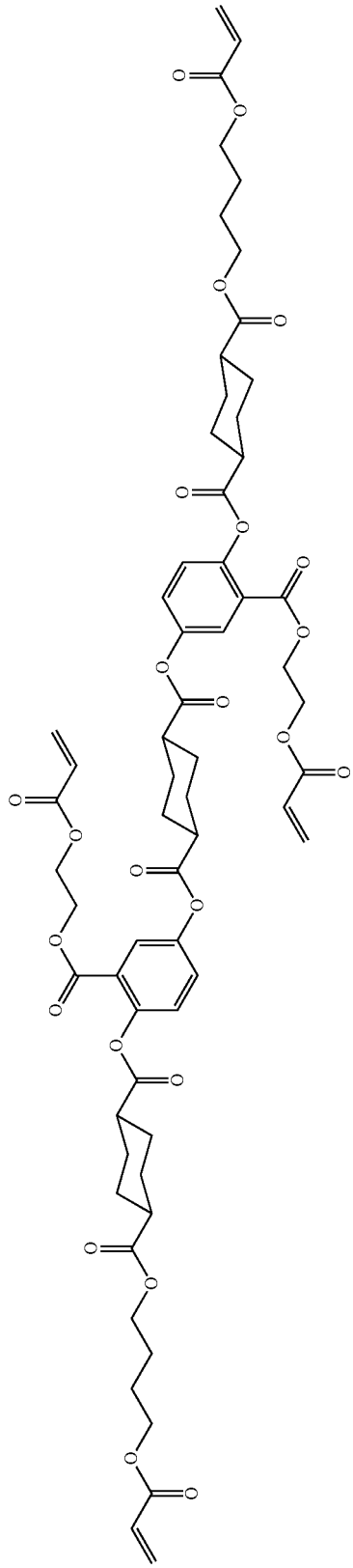

-continued
A-6 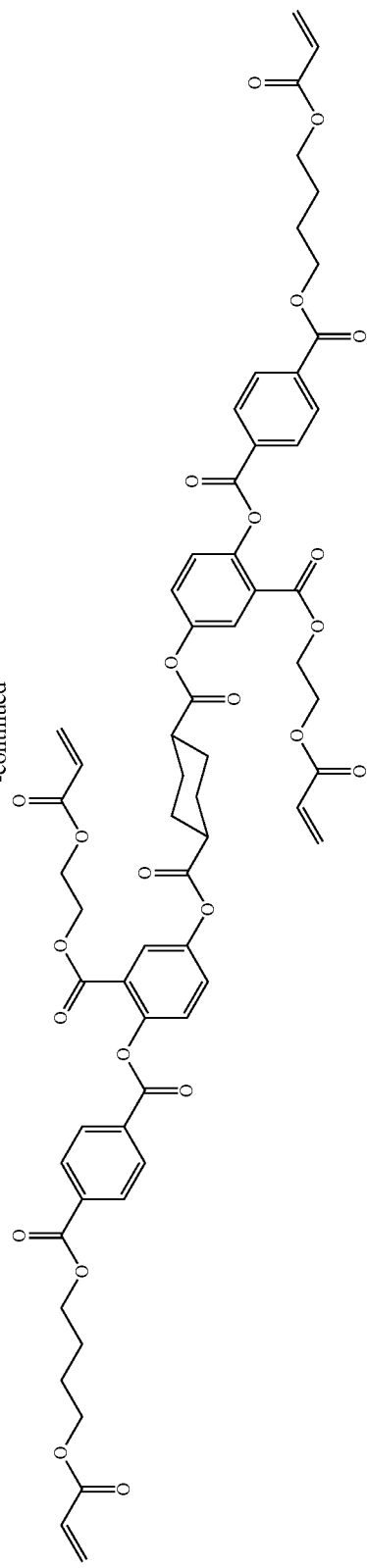
A-7 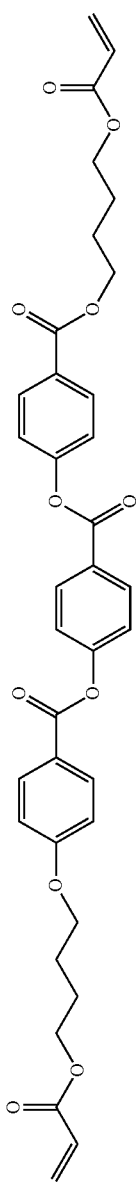
A-8 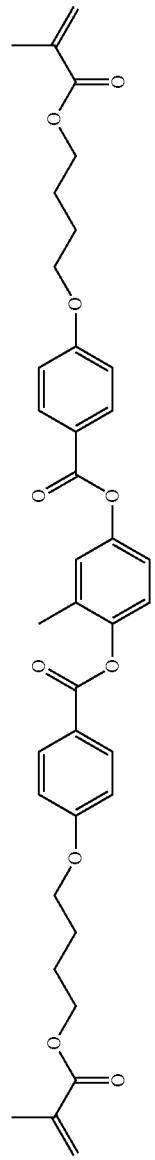
A-9 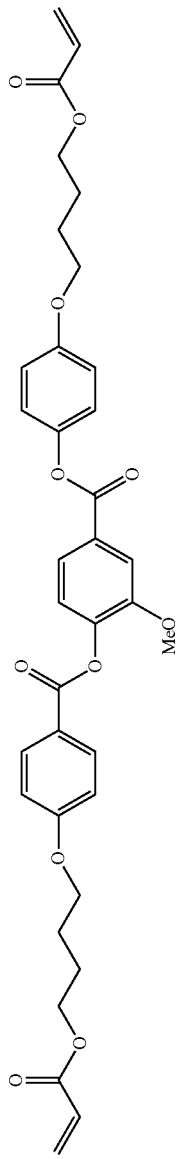

-continued
A-10
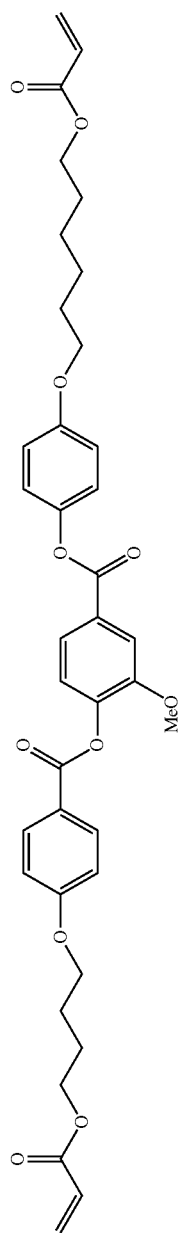
A-11
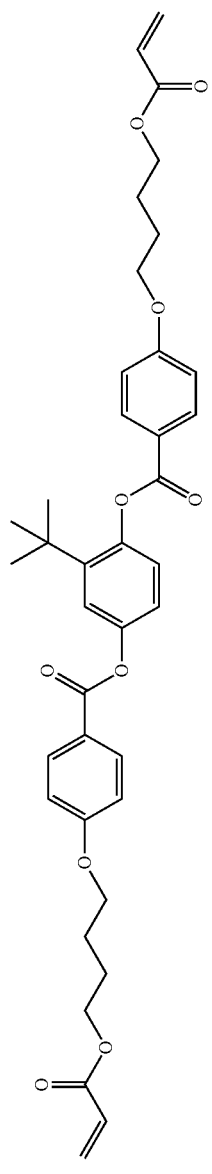
A-12
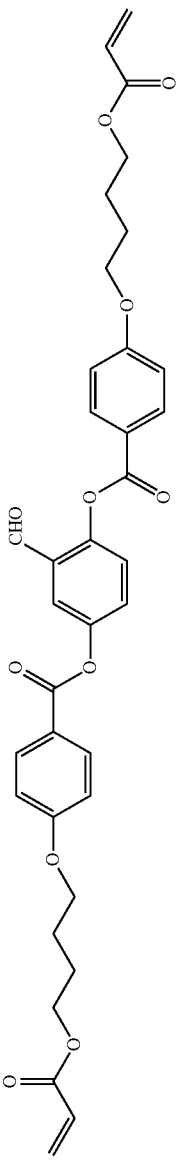

-continued
A-13
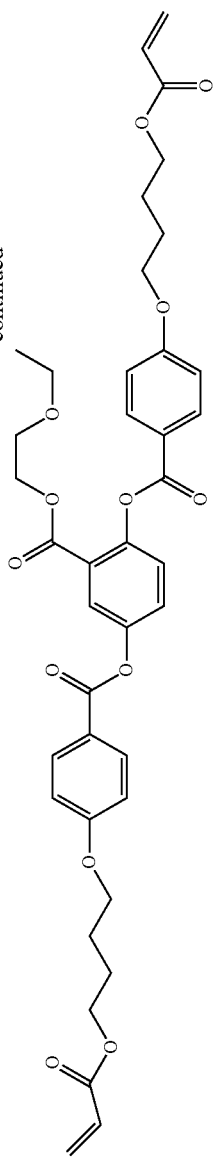
A-14
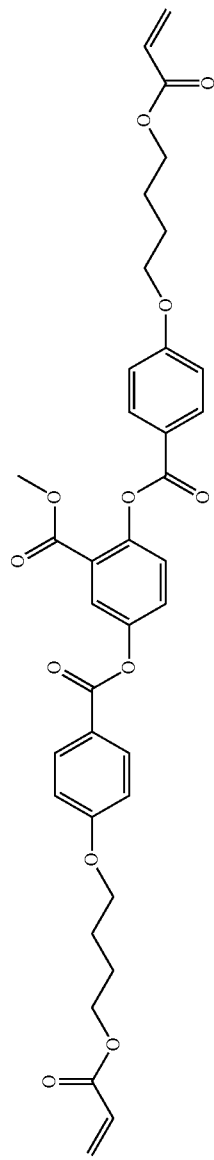
A-15
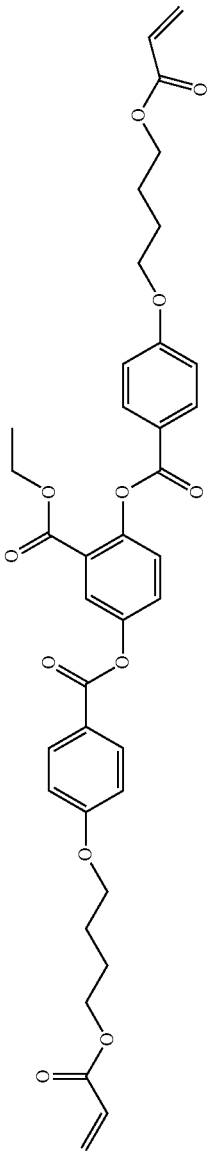

-continued
A-16
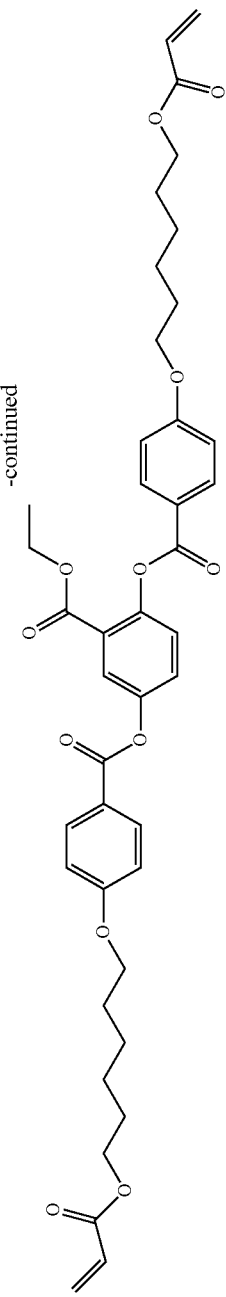
A-17
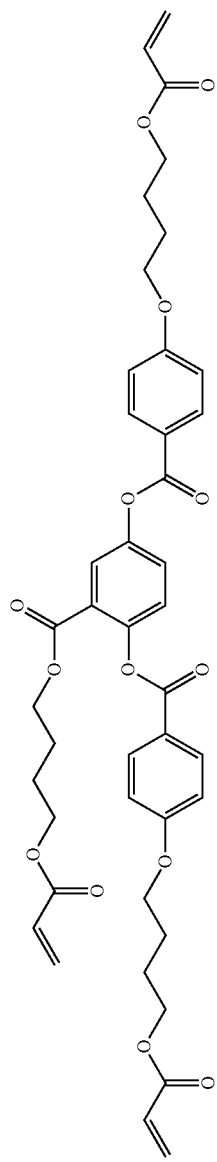
A-18
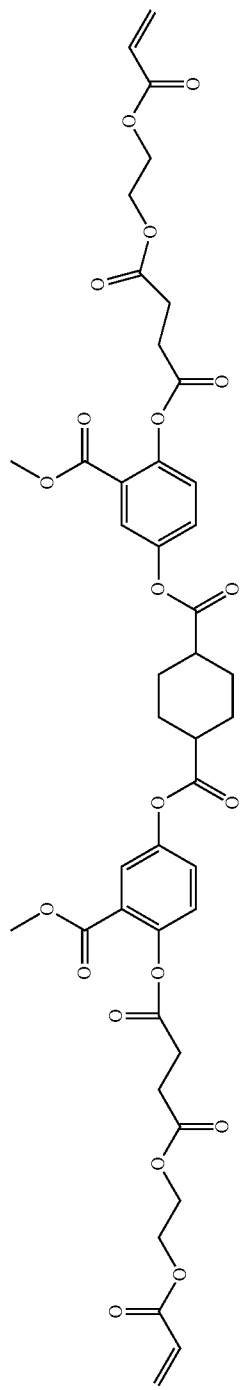

-continued
A-19
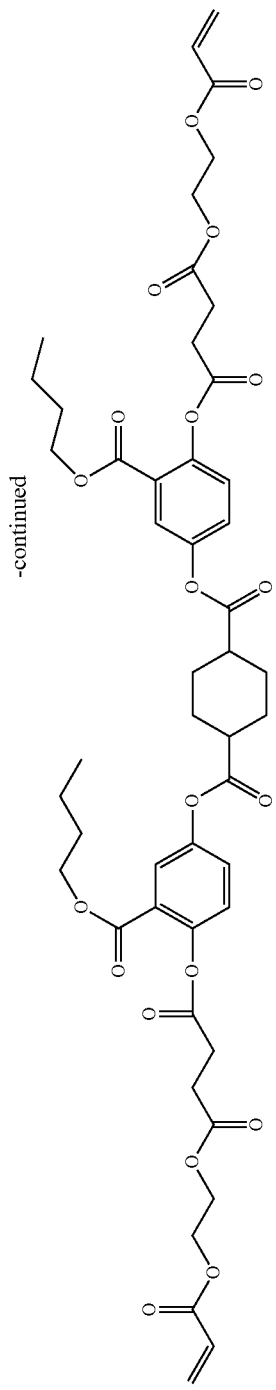
A-20
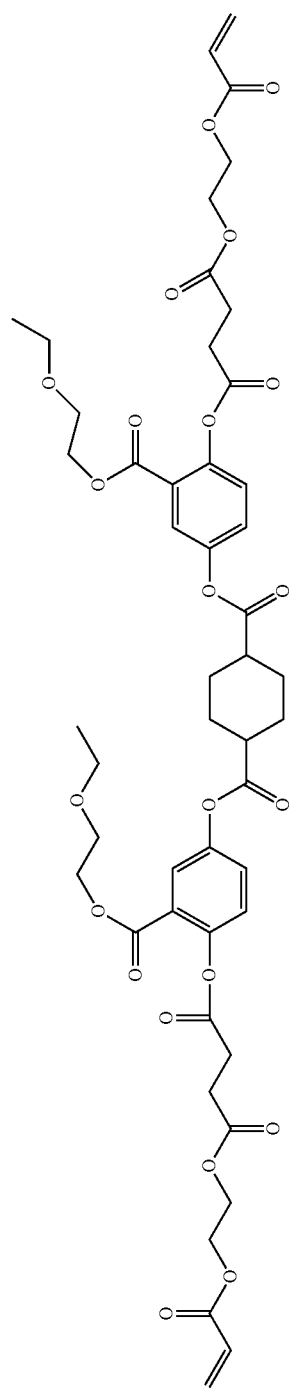
A-21
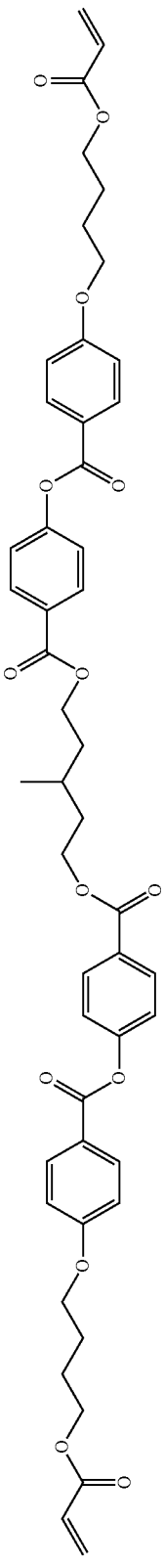

-continued
A-22
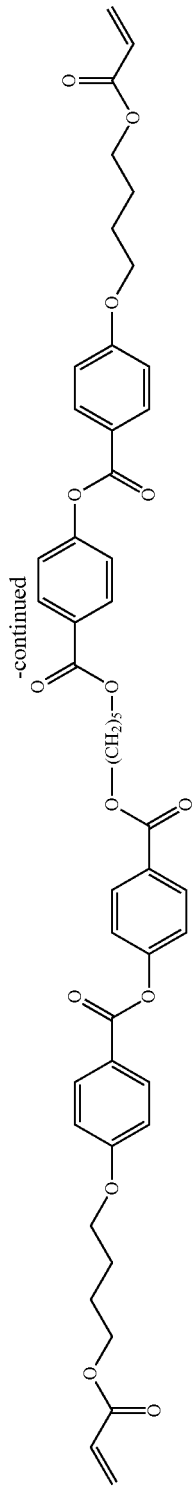
A-23
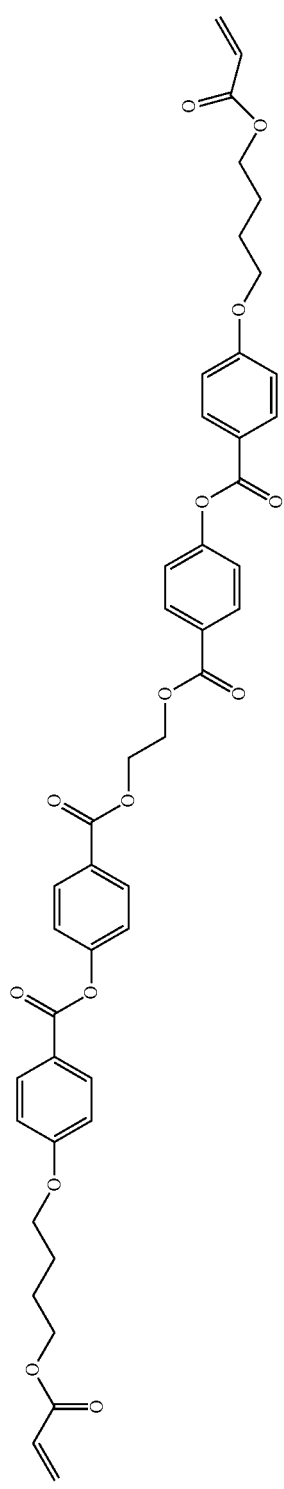

A-24
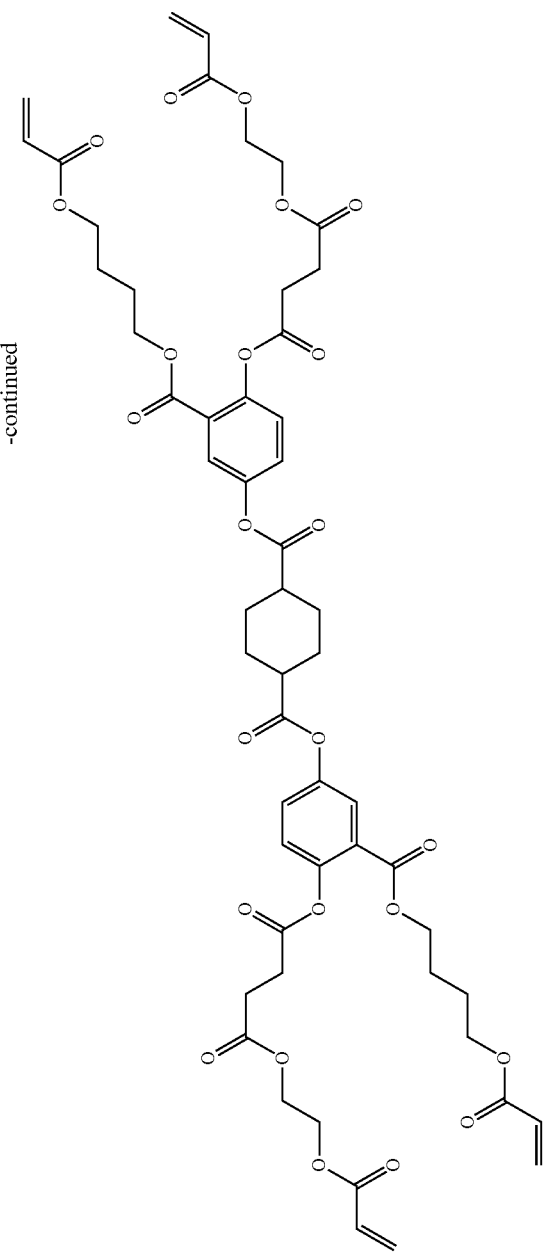
A-25
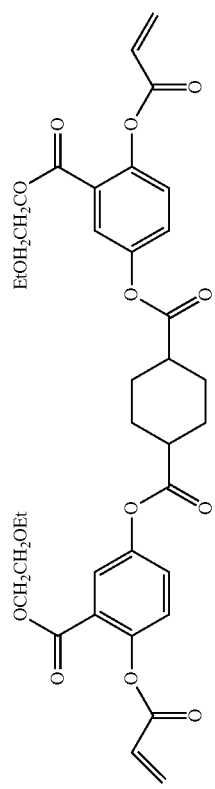

-continued
A-26
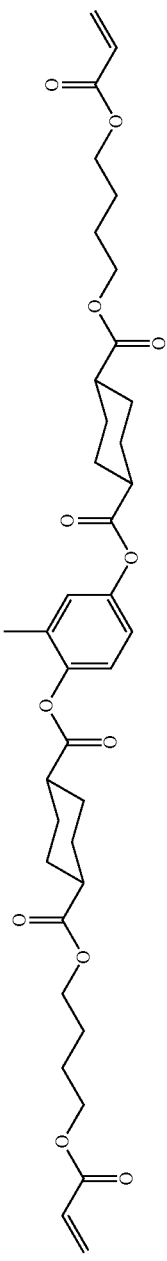
A-27
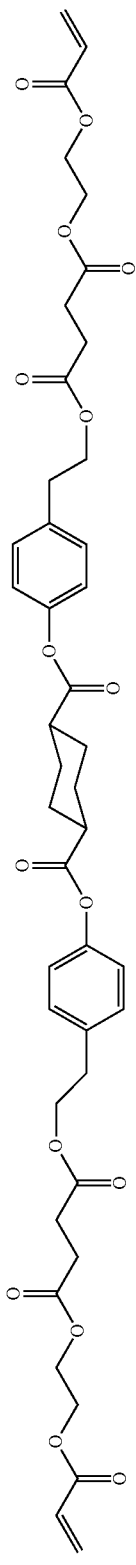
A-29
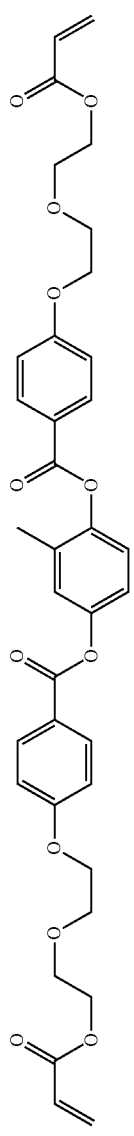

A-30
A-31
A-32
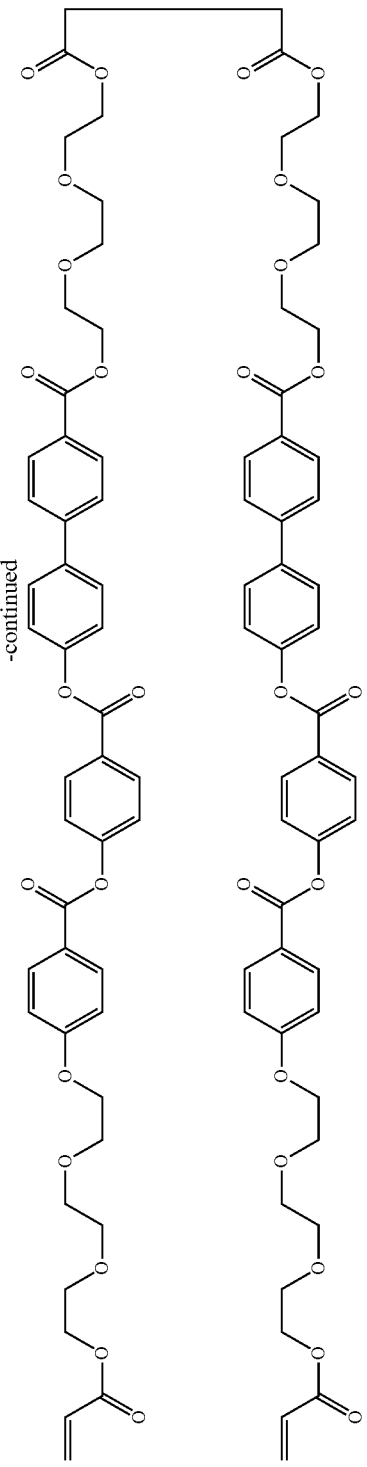
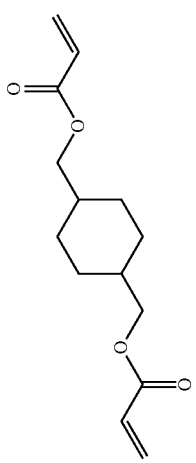
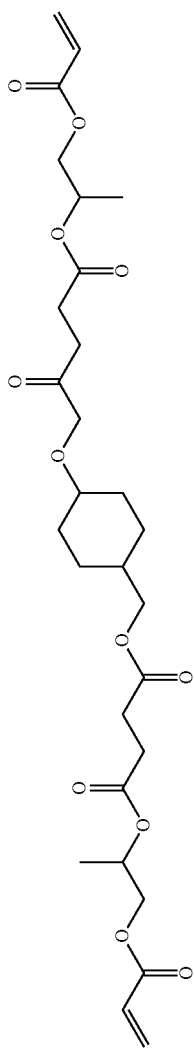

-continued
A-33
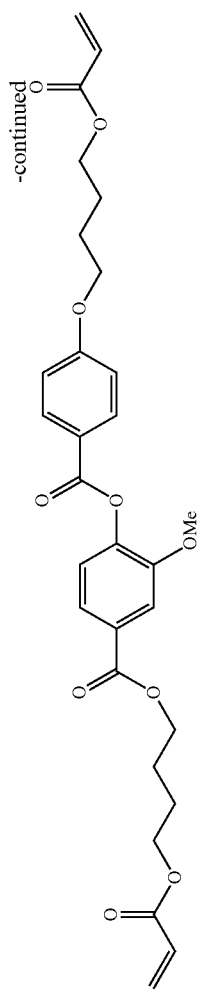
A-34
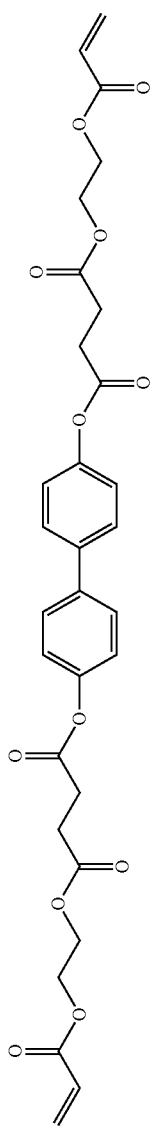
A-35
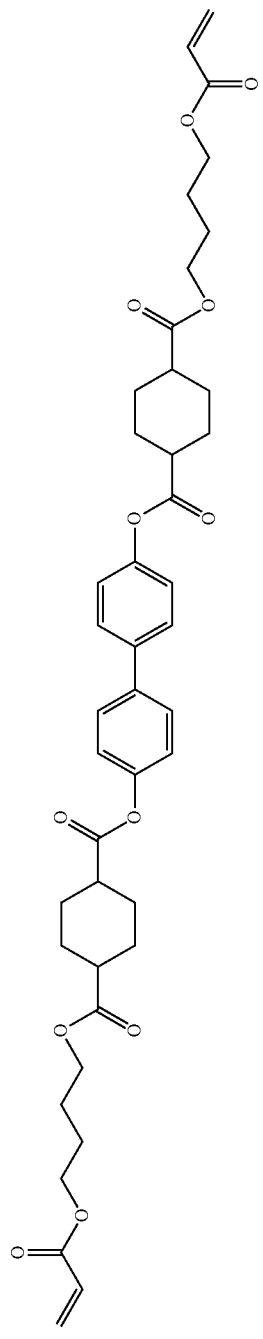

-continued
A-36
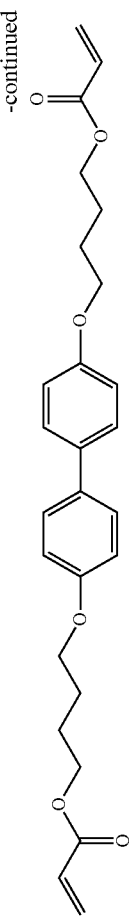
A-37
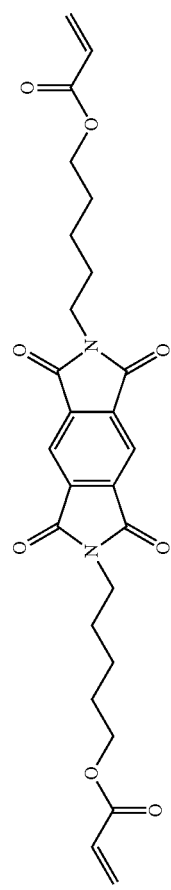
A-38
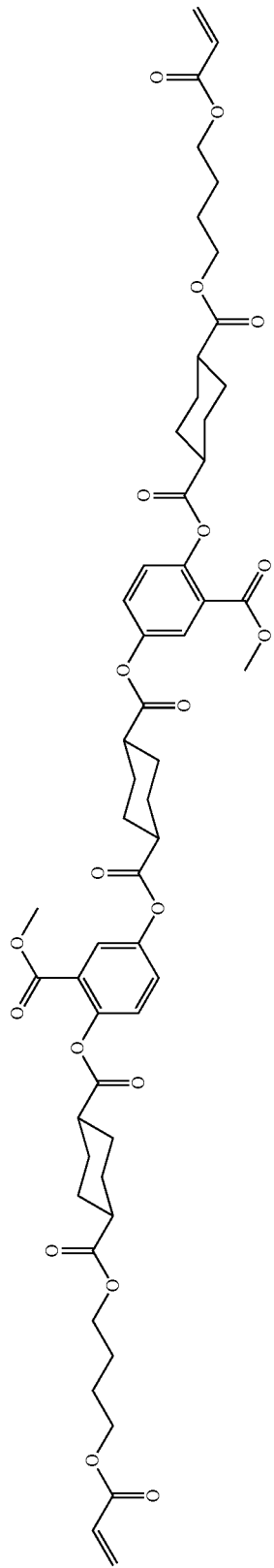

-continued
A-39
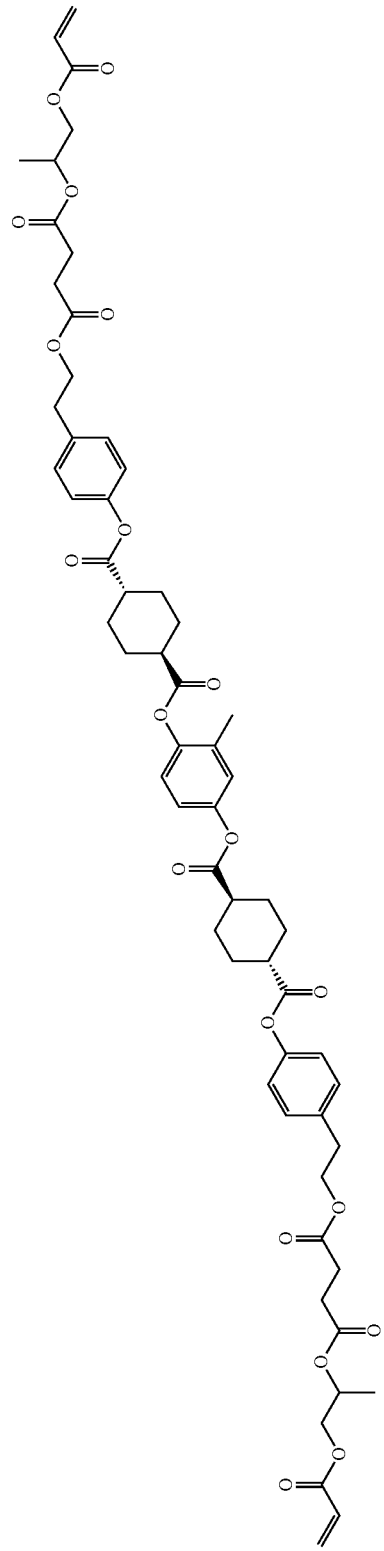
A-40
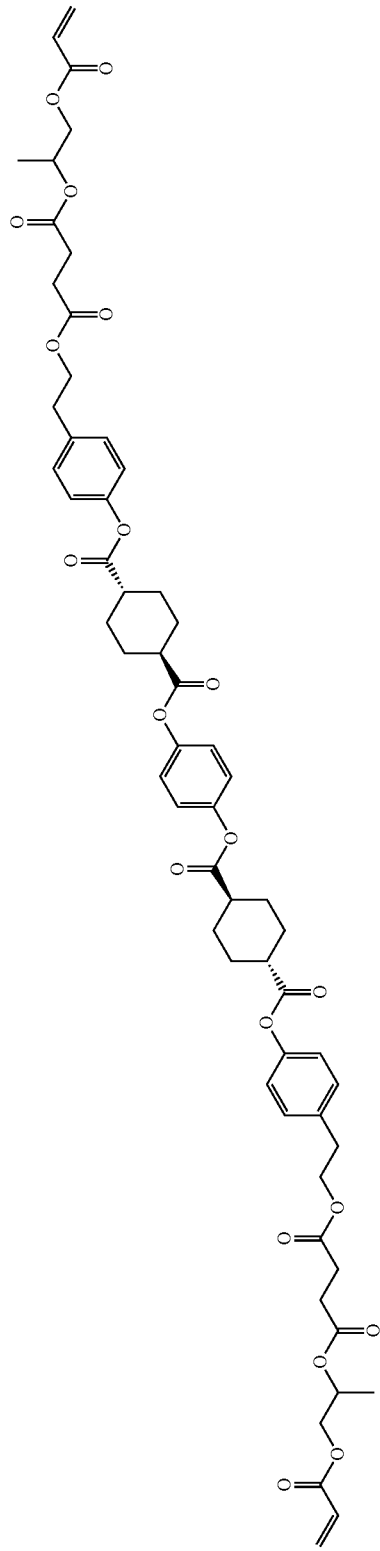

A-41
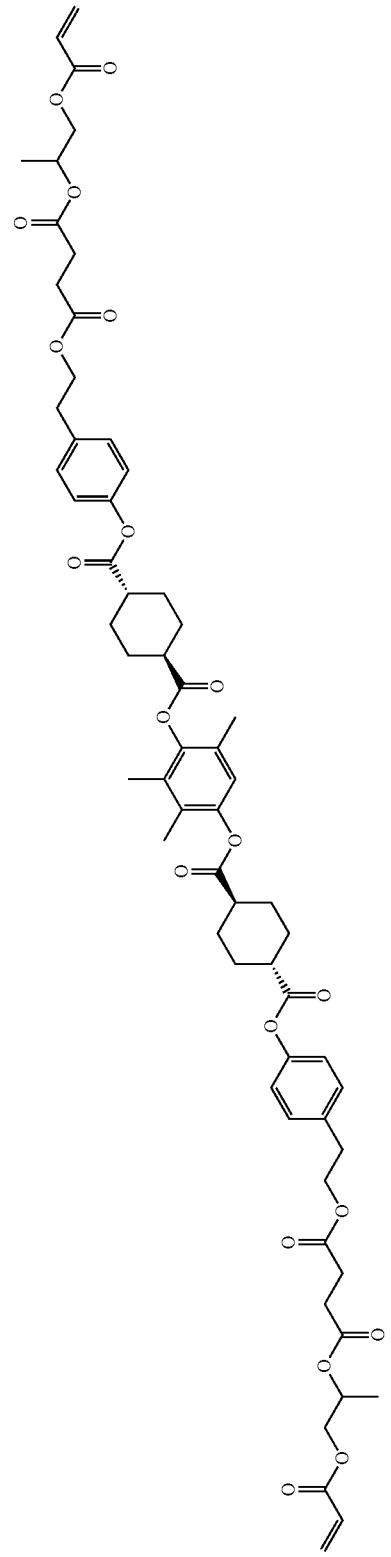
A-42
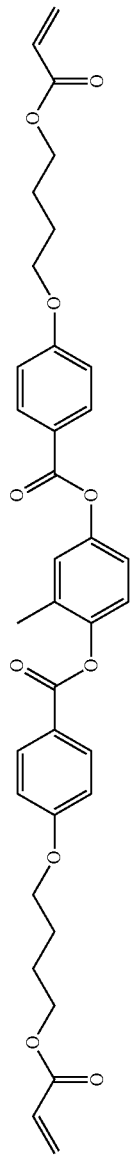
A-43
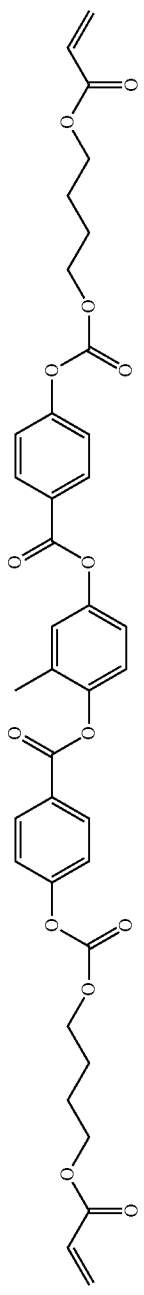

In the present invention, in a case in which the polymerizable liquid crystal composition contains the polymerizable compound is not particularly limited and with respect to total 100 parts by mass of the above-described liquid crystal compound and polymerizable compound, the content of the polymerizable compound is preferably 1 to 40 parts by mass and is more preferably 5 to 30 parts by mass.

<Solvent>

The polymerizable liquid crystal composition forging the optically anisotropic layer preferably contains an organic solvent from the viewpoint of workability for forming the optically anisotropic layer and the like.

Specific examples of the organic solvent include ketones (such as acetone, 2-butanone, methyl isobutyl ketone, and cyclohexanone), ethers (such as dioxane and tetrahydrofuran), aliphatic hydrocarbons (such as hexane), alicyclic hydrocarbons (such as cyclohexane), aromatic hydrocarbons (such as toluene, xylene, and trimethylbenzene), halogenated carbons (such as dichloromethane, dichloroethane, dichlorobenzene, and chlorotoluene), esters (such as methyl acetate, ethyl acetate, and butyl acetate), water, alcohols (such as ethanol, isopropanol, butanol, and cyciohexanol), cellosolves (such as methyl cellosolve and ethyl cellosolve), cellosolve acetates, sulfoxides (such as dimethyl sulfoxide), and amides (such as dimethylformamide and dimethylacetamide). These may be used alone or may be used in combination of two or more kinds.

In the present invention, as the method of forming the optically anisotropic layer, for example, a method in which a desired alignment state is obtained using the polymerizable liquid crystal composition containing an arbitrary polymerizable compound and an organic solvent in addition to the above-described liquid crystal compound and polymerization initiator and then the alignment state is fixed by polymerization, and the like may be used.

Herein, the polymerization conditions are not particularly limited and in the polymerization by photoirradiation, ultraviolet rays are preferably used. The irradiation dose is preferably 10 mJ/cm$^2$ to 50 J/cm$^2$, more preferably 20 mJ/cm$^2$ to 5 J/cm$^2$, still more preferably 30 mJ/cm$^2$ to 3 J/cm$^2$, and particularly preferably 50 to 1,000 mJ/cm$^2$. In addition, in order to promote the polymerization reaction, the polymerization may be carried out under a heating condition.

In the present invention, the optically anisotropic layer can be formed on an arbitrary support described later or a polarizer of a polarizing plate of the present invention described later.

In addition, in the present invention, for the reason for further improving the durability of the optically anisotropic layer, the optically anisotropic layer is preferably a layer obtained by aligning the above-described polymerizable liquid crystal composition in a smectic phase and then carrying out polymerization (fixing the alignment). This is considered that because the centers of the liquid crystal molecules are aligned in a smectic phase compared to a nematic phase, the composition hardly undergoes the above-described hydrolysis by the structure near the ester bond.

As described above, the extrapolated glass transition starting temperature of the optically anisotropic layer having the optical film of the present invention is 70° C. or higher. However, for the reason for further improving the durability of the optically anisotropic layer, the extrapolated glass transition starting temperature is preferably 80° C. or higher, more preferably 90° C. or higher, and still more preferably 95° C. to 120° C.

Herein, the method of adjusting the extrapolated glass transition starting temperature is not particularly limited, and for example, by appropriately selecting the kind of the polymerizable group of the above-described liquid crystal compound and an arbitrary polymerizable compound (hereinafter, abbreviated as "monomer" in this paragraph), the kind of a substituent of the monomer and the constitutional ratio thereof, the molecular weight of the monomer after polymerization, and the like, the extrapolated glass transition stalling temperature can be controlled to be in a desired range.

In addition, as another method of adjusting the extrapolated glass transition starting temperature, a method of using the above-described oxime type polymerization initiator, a method of increasing the temperature of the film (the coating film of the polymerizable composition) at the time of ultraviolet irradiation.

In addition, the optically anisotropic layer of the optical film of the present invention preferably satisfies Expression (1) from the viewpoint of imparting excellent viewing angle properties.

$$0.75 \leq Re(450)/Re(550) \leq 1.00 \quad (I)$$

Herein, in Formula (1), Re(450) represents an in-plane retardation of the optically anisotropic layer at a wavelength of 450 nm, and Re(550) represents an in-plane retardation of the optically anisotropic layer at a wavelength of 550 nm.

In addition, the in-plane retardation value refers a value measured with light at the measurement wavelength using Axo Scan (OPMF-1, manufactured by Axometrics Inc.) and bundled software.

In the present invention, although the thickness of the optically anisotropic layer is not particularly limited, the thickness thereof is preferably 0.1 to 10 μm and more preferably 0.5 to 5 μm.

[Support]

The optical film of the present invention may have a support as a substrate for forming the optically anisotropic layer as described above.

Such a support is preferably transparent and specifically, the support preferably has a light transmittance of 80% or more.

Examples of such a support include glass substrates and polymer films. Examples of the material for the polymer film include cellulose-based polymers; acrylic polymers having acrylic ester polymers such as polymethyl rnethacrylate, and lactone ring-containing polymers; thermoplastic norbomene-based polymers; polycarbonate-based polymers; polyester-based polymers such as polyethylene terephthalate and polyethylene naphthalate; styrene-based polymers such as polystyrene and acrylonitrile-styrene copolymers (AS resin); polyolefin-based polymers such as polyethylene, polypropylene, and ethylene-propylene copolymers; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers containing a mixture of these polymers.

In addition, the polarizer which will be described later may function as such a support.

In the present invention, although the thickness of the support is not particularly limited, the thickness thereof is preferably 5 to 60 μm and more preferably 5 to 30 μm.

[Alignment Film]

In the case in which the optical film has the above-described arbitrary support, the optical film of the present invention preferably has an alignment film between the support and the optically anisotropic layer. The above-described support may function as an alignment film.

The alignment film generally has a polymer as a main component. The materials for the polymer material for an alignment film are described in many documents and many commercially available products can be used.

The polymer material used in the present invention is preferably a polyvinyl alcohol, or a polyimide, or a derivative thereof. Particularly, a modified or non-modified polyvinyl alcohol is preferable.

Examples of alignment films that can be used in the present invention include alignment films described in Line 24 on Page 43 to Line 8 on Page 49 of WO01/88574A; modified polyvinyl alcohols described in paragraphs [0071] to [0095] of JP3907735B; and a liquid crystal alignment film formed by a liquid crystal aligning agent described in JP2012-155308A.

In the present invention, for the reason that surface state deterioration can be prevented by avoiding a contact with the surface of the alignment film at the time of forming the alignment film, an optical alignment film is preferably used as the alignment film.

Although the optical alignment film is not particularly limited, polymer materials such as polyamide compounds and polyimide compounds described in paragraphs [0024] to of WO2005/096041A; a liquid crystal alignment film formed by a liquid crystal aligning agent having an optical-aligned group described in JP2012-155308A; and LPP-JP265CP, product name, manufactured by Rohe technologies Ltd. can be used.

In addition, in the present invention, although the thickness of the alignment film is not particularly limited, from the viewpoint of forming an optically anisotropic layer having a uniform film thickness by alleviating the surface roughness present on the support, the thickness thereof is preferably 0.01 to 10 µm, more preferably 0.01 to 1 µm, and still more preferably 0.01 to 0.5 µm.

[Hard Coat Layer]

The optical film of the present invention preferably has a hard coat layer for imparting film physical strength. Specifically, the hard coat layer may be provided on the side of the support opposite to the side on which the alignment film is provided (refer to FIG. 1B) or may be provided on the side of the optically anisotropic layer opposite to the side on which the alignment film is provided (refer to FIG. 1C).

As the hard coat layer, layers described in paragraphs [0190] to [0196] of JP2009-98658A can be used.

[Other Optically Anisotropic Layers]

The optical film of the present invention may have optically anisotropic layers other than the layer obtained by polymerizing the above-described polymerizable liquid crystal composition containing the liquid crystal compound represented by Formula (1) and the polymerization initiator (hereinafter, formally referred to as "optically anisotropic layer of the present invention" in the paragraph). That is, the optical film of the present invention may have a laminated structure of the optically anisotropic layer of the present invention and other optically anisotropic layers.

Such other optically anisotropic layers are not particularly limited as long as the optically anisotropic layers include liquid crystal compounds other than the above-described liquid crystal compound represented by Formula (1).

Here, generally, liquid crystal compounds are classified into a rod-like type and a disk-like type according to the shape thereof. Further, each includes a low molecular type and a high molecular type. The term "high molecular" generally refers to a compound having a degree of polymerization of 100 or more (Polymer Physics-Phase Transition Dynamics, by Masao Doi, p. 2, published by Iwanami Shoten, Publishers, 1992). In the present invention, any type of liquid crystal compound can be used, but a rod-like liquid crystal compound or a discotic liquid crystal compound (disk-like liquid crystal compound) is preferably used. Two or more kinds of rod-like liquid crystal compounds, two or more kinds of disk-like liquid crystal compounds, or a mixture of a rod-like liquid crystal compound and a disk-like liquid crystal compound may be used. In order to fix the above-described liquid crystal compound, the optically anisotropic layer is more preferably formed using a rod-like liquid crystal compound or disk-like liquid crystal compound having a polymerizable group, and the liquid crystal compound still more preferably has two or more polymerizable groups in one molecule. In the case of a mixture of two or more kinds of the liquid crystal compounds, at least one kind of liquid crystal compound preferably has two or more polymerizable groups in one molecule.

As the rod-like liquid crystal compound, for example, the rod-like liquid crystal compounds described in claim 1 of JP1999-513019A (JP-H11-513019A) or paragraphs [0026] to [0098] of JP2005-289980A can be preferably used, and, as the discotic liquid crystal compounds, for example, the discotic liquid crystal compounds described in paragraphs [0020] to [0067] of JP2007-108732A and paragraphs [0013] to [0108] of JP2010-244038A can be preferably used, but the liquid crystal compounds are not limited thereto.

[Ultraviolet Absorbent]

The optical film of the present invention preferably includes all ultraviolet (UV) absorbent in consideration of effect of external light (particularly, ultraviolet rays) and more preferably includes an ultraviolet absorbent in the support.

As the ultraviolet absorbent, any of known ultraviolet absorbents can be used since ultraviolet absorbency can be exhibited. Among these ultraviolet absorbents, in order to obtain a high ultraviolet absorbency and ultraviolet absorptivity (ultraviolet cutting ability) used for an electronic image display device, a benzotriazole-based or hydroxyphenyl triazine-based ultraviolet absorbent is preferable. In addition, in order to widen the ultraviolet absorption width, two or more kinds of ultraviolet absorbents having different maximum absorption wavelengths can be used in combination.

[Polarizing Plate]

A polarizing plate of the present invention has the above-described optical film of the present invention and a polarizer.

[Polarizer]

The polarizer of the polarizing plate of the present invention is not particularly limited as long as the polarizer is a member having a function of converting light into specific linearly polarized light, and conventionally known absorptive type polarizer and reflective type polarizer can be used.

An iodine-based polarizer, a dye-based polarizer using a dichroic dye, a polyene-based polarizer, and the like are used as the absorptive type polarizer. The iodine-based polarizer and the dye-based polarizer are a coating type polarizer and a stretching type polarizer, any one of these polarizers can be applied. However, a polarizer which is prepared by allowing polyvinyl alcohol to adsorb iodine or a dichroic dye and performing stretching is preferable.

In addition, examples of a method of obtaining a polarizer by performing stretching and dyeing in a state of a laminated film in which a polyvinyl alcohol layer is formed on a substrate include methods disclosed in JP5048120B, JP5143918B, JP4691205B, JP4751481B, and JP4751486B, and known technologies related to these polarizers can be preferably used.

A polarizer in which thin films having different birefringence are laminated, a wire grid type polarizer, a polarizer in which a cholesteric liquid crystal having a selective reflection range and a ¼ wavelength plate are combined, and the like are used as the reflective type polarizer.

Among these, a polarizer containing a polyvinyl alcohol-based resin (a polymer including —$CH_2$—CHOH— as a repeating unit, in particular, at least one selected from the group consisting of polyvinyl alcohol and an ethylene-vinyl alcohol copolymer) is preferable from the viewpoint of more excellent adhesiveness with respect to the resin layer which will be described below.

In the present invention, although the thickness of the polarizer is not particularly limited, the thickness thereof is preferably 3 μm to 60 μm, more preferably 5 μm to 30 μm, and still more preferably 5 μm to 15 μm.

[Pressure Sensitive Adhesive Layer]

The polarizing plate of the present invention may have a pressure sensitive adhesive layer arranged between the optically anisotropic layer in the optical film of the present invention and the polarizer.

The pressure sensitive adhesive layer used for lamination of the optically anisotropic layer and the polarizer is, for example, a substance in which a ratio between storage elastic modulus G' and loss elastic modulus G" (tan δ=G"/G') is 0.001 to 1.5, where G' and G" are measured with a dynamic viscoelastometer. Such a substance includes a so-called pressure sensitive adhesive or readily creepable substance. As the pressure sensitive adhesive that can be used in the present invention, for example, a polyvinyl alcohol-based pressure sensitive adhesive may be used, but there is no limitation thereto.

[Image Display Device]

An image display device of the present invention is an image display device having the optical film of the present invention or the polarizing plate of the present invention.

The display element used for the image display device of the present invention is not particularly limited and examples thereof include a liquid crystal cell, an organic electroluminescent (hereinafter, abbreviated as "EL") display panel, and a plasma display panel.

Among these, a liquid crystal cell and an organic EL display panel are preferable, and a liquid crystal cell is more preferable. That is, for the image display device of the present invention, a liquid crystal display device using a liquid crystal cell as a display element, and an organic EL display device using an organic EL display panel as a display element are preferable and a liquid crystal display device is more preferable.

[Liquid Crystal Display Device]

A liquid crystal display device as an example of the image display device of the present invention is a liquid crystal display device including the above-described polarizing plate of the present invention and a liquid crystal cell.

In the present invention, it is preferable that the polarizing plate of the present invention is used for the polarizing plate of the front side, out of the polarizing plates provided on the both sides of the liquid crystal cell, and it is more preferable that the polarizing plate of the present invention is used for the polarizing plates on the front and rear sides.

Hereinafter, the liquid crystal cell constituting the liquid crystal display device will be described in detail.

<Liquid Crystal Cell>

The liquid crystal cell for use in the liquid crystal display device is preferably of a vertical alignment (VA) mode, an optical compensated bend (OCB) mode, an in-plane-switching (IPS) mode or a twisted nematic (TN) mode but the cell mode is not limited thereto.

In a TN mode liquid crystal cell, rod-like liquid crystal molecules are aligned substantially horizontally in a case in which no voltage is applied and are further aligned in a twisted manner in a range of 60° to 120°. The TN mode liquid crystal cell is most often used in a color TFT liquid crystal display device and is mentioned in many literatures.

In a VA mode liquid crystal cell, rod-like liquid crystal molecules are aligned substantially vertically in a case in which no voltage is applied. Examples of the VA mode liquid crystal cells include (1) a narrowly defined VA mode liquid crystal cell (described in JP1990-176625A (JP-H02-176625A)) in which rod-like liquid crystal molecules are aligned substantially vertically in a case in which no voltage is applied and are aligned substantially horizontally in a case in which a voltage is applied, (2) a multi-domain VA mode (MVA mode) liquid crystal cell for enlarging the viewing angle (SID97, Digest of Tech. Papers (Proceedings) 28 (1997) 845), (3) a liquid crystal cell in a mode (n-ASM mode) in which rod-like liquid crystal molecules are aligned substantially vertically in a case in which no voltage is applied and are aligned in twisted multi-domain alignment in a case in which a voltage is applied (Proceedings of Japanese Liquid Crystal Conference, 58 and 59 (1998)), and (4) a SURVIVAL mode liquid crystal cell (presented in LCD International 98). The liquid crystal cell may be of any of a patterned vertical alignment (PVA) type, an optical alignment type, and a polymer-sustained alignment (PSA) type. These modes are described in detail in JP2006-215326A and JP2008-538819A.

In an IPS mode liquid crystal cell, rod-like liquid crystal molecules are aligned substantially horizontally with respect to a substrate and application of an electric field parallel to the substrate surface causes the liquid crystal molecules to respond planarly. The IPS mode displays black in a case in which no electric field is applied and a pair of upper and lower polarizing plates have absorption axes which are orthogonal to each other. A method of improving the viewing angle by reducing light leakage during black display in an oblique direction using an optical compensation sheet is described in JP1998-54982A (JP-H10-54982A), JP1999-202323A (JP-H11-202323A), JP1997-292522A (JP-1109-292522A), JP1999-133408A (JP-11-133408A), JP1999-305217A (JP-11-305217A), JP1998-307291A (JP-H10-307291A), and the like.

[Organic EL Display Device]

As the organic EL display device which is an example of the image display device of the present invention, for example, an embodiment which includes, from the visible side, the polarizing plate of the present invention, a plate having a λ/4 function (hereinafter referred to also as "λ/4 plate") and an organic EL display panel in this order is suitable, The "plate having a λ/4 function" as used herein refers to a plate having a function of converting linearly polarized light at a specific wavelength into circularly polarized light (or circularly polarized light into linearly polarized light). Specific examples of an embodiment in which the λ/4 plate is of a single ayer structure include a stretched polymer film, and a phase difference film in which an optically anisotropic layer having a λ/4 function is provided on a support. A specific example of an embodiment in which the λ/4 plate is of a multilayer structure includes a broadband λ/4 plate in which the λ/4 plate and a λ/2 plate are laminated on each other.

The organic EL display panel is a display panel configured using an organic EL device in which an organic light emitting layer (organic electroluminescent layer) is sandwiched between electrodes (between a cathode and an anode). The configuration of the organic EL display panel is not particularly limited but any known configuration is adopted.

EXAMPLES

The present invention will be described below in further detail based on examples. The materials, amounts used, ratios, treatments and treatment procedures shown in the examples below can be modified as appropriate in the range of not departing from the spirit of the present invention. Therefore, the scope of the present invention should not be construed as being limited to the following examples.

Example 1

<Formation of Optical Alignment Film P-1>

A coating solution 1 for photo alignment prepared with reference to the description of Example 3 of JP2012-155308A was applied to one surface of a polarizer 1 having a film thickness of 20 μm prepared by causing iodine to adsorb to a stretched polyvinyl alcohol film according to Example 1 of JP2001-141926A using a secondary bar.

After application, the solvent was removed by drying to form a photoisomerizable composition layer 1.

The obtained photoisomerizable composition layer 1 was irradiated with polarized ultraviolet rays (500 mJ/cm$^2$, 750 W ultra-high pressure mercury lamp) to form an optical alignment film P-1.

<Formation of Optically Anisotropic Layer 1>

The coating solution 1 for an optically anisotropic layer was applied to on the optical alignment film P-1 having the following composition by a spin coating method to form a liquid crystal composition layer 1.

The formed liquid crystal composition layer 1 was once heated on a hot plate until a nematic phase (Ne phase) was exhibited and then cooled to 60° C. so that the alignment was stabilized in a smectic A phase (SmA phase).

Then, while keeping the temperature at 60° C., the alignment was fixed by the ultraviolet irradiation and an optically anisotropic layer 1 was formed. Thus, an optical film was prepared.

The obtained optical film was immersed in warm water at 50° C. for 30 minutes or longer and the softened polarizer was removed. Thus, the optically anisotropic layer 1 was isolated. As a result of measuring the extrapolated glass transition starting temperature of the optically anisotropic layer 1, the extrapolated glass transition starting temperature was 74° C.

Coating Solution 1 for Optically Anisotropic Layer

| | |
|---|---|
| Liquid crystal compound L-1 shown below | 43.75 parts by mass |
| Liquid crystal compound L-2 shown below | 43.75 parts by mass |
| Polymerizable compound A-1 shown below | 12.50 parts by mass |
| Polymerization initiator (IRGACURE 184, manufactured by BASF SE) | 3.00 parts by mass |
| Leveling agent (Compound T-1 shown below) | 0.20 parts by mass |
| Methyl ethyl ketone | 219.30 parts by mass |

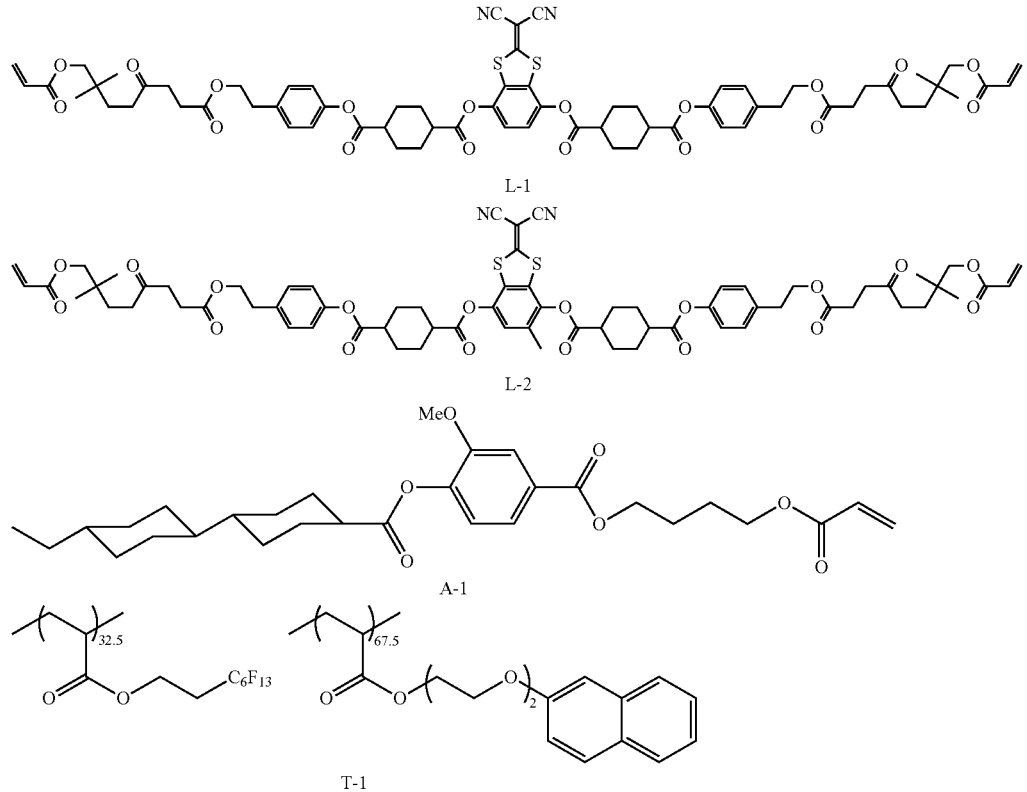

Example 2

An optically anisotropic layer 2 of Example 2 was formed in the same manner as in Example 1 except that a coating solution 2 for an optically anisotropic layer having the following composition was used instead of using the coating solution 1 for an optically anisotropie layer in Example 1. As a result of measuring the extrapolated glass transition starting temperature of the optically anisotropie layer 2, the extrapolated glass transition starting temperature was 82° C.

Coating Solution 2 for Optically Anisotropic Layer

| | |
|---|---|
| Liquid crystal compound L-1 shown above | 43.75 parts by mass |
| Liquid crystal compound L-2 shown above | 43.75 parts by mass |
| Polymerizable compound A-1 shown above | 12.50 parts by mass |
| Polymerization initiator S-1 (oxime type) shown below | 3.00 parts by mass |
| Leveling agent (Compound T-1 shown above) | 0.20 parts by mass |
| Methyl ethyl ketone | 219.30 parts by mass |

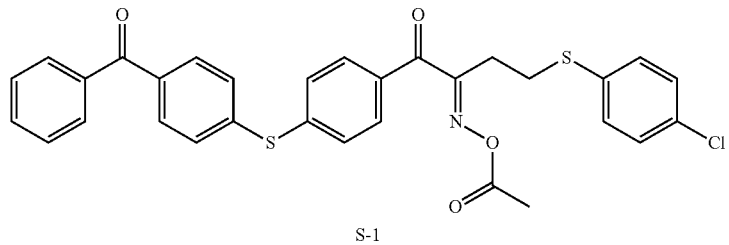

S-1

Example 3

An optically anisotropic layer 3 of Example 3 was formed in the same manner as in Example 1 except that a coating solution 3 for an optically anisotropic layer having the following composition was used that instead of using the coating solution 1 for an optically anisotropic layer in Example 1, As a result of measuring the extrapolated glass transition starting temperature of the optically anisotropic layer 3, the extrapolated glass transition starting temperature was 96° C.

Coating Solution 3 for Optically Anisotropic Layer

| | |
|---|---|
| Liquid crystal compound L-1 shown above | 43.75 parts by mass |
| Liquid crystal compound L-2 shown above | 43.75 parts by mass |
| Polymerizable compound A-2 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

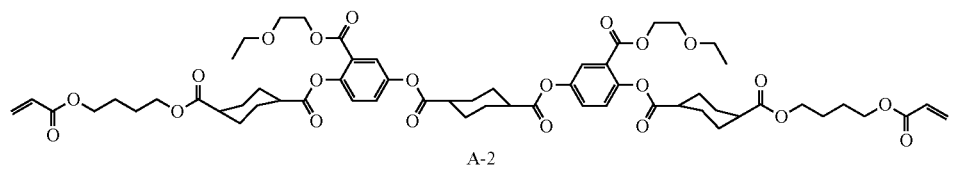 [SMILES: C=CC(=O)OCCCCOC(=O)C1CCC(C(=O)Oc2ccc(OC(=O)C3CCC(C(=O)Oc4ccc(OC(=O)C5CCC(C(=O)OCCCCOC(=O)C=C)CC5)c(C(=O)OCCOCC)c4)CC3)cc2C(=O)OCCOCC)CC1 ; "A-2"]

A-2

Example 4

An optically anisotropic layer 4 of Example 4 was formed in the same manner as in Example 1 except that a coating solution 4 for an optically anisotropic layer having the following composition was used instead of the coating solution 1 for an optically anisotropic layer in Example 1. As a result of measuring the extrapolated glass transition starting temperature of the optically anisotropic layer 4, the extrapolated glass transition starting temperature was 95° C.

Coating Solution 4 for Optically Anisotropic Layer

| | |
|---|---|
| Liquid crystal compound L-1 shown above | 43.75 parts by mass |
| Liquid crystal compound L-2 shown above | 43.75 parts by mass |
| Polymerizable compound A-3 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

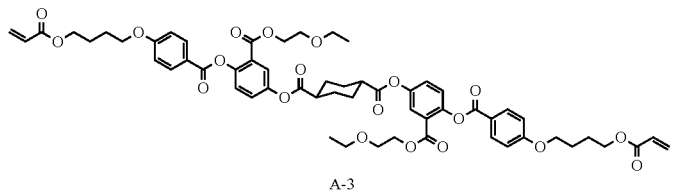 [SMILES: C=CC(=O)OCCCCOc1ccc(C(=O)Oc2ccc(OC(=O)C3CCC(C(=O)Oc4ccc(OC(=O)c5ccc(OCCCCOC(=O)C=C)cc5)c(C(=O)OCCOCC)c4)CC3)cc2C(=O)OCCOCC)cc1 ; "A-3"]

A-3

Example 5

An optically anisotropic layer 5 of Example 5 was formed in the same manner as in Example 1 except that a coating solution 5 for an optically anisotropic layer having the following composition was used instead of the coating solution 1 for an optically anisotropic layer in Example 1. As a result of measuring the extrapolated glass transition starting temperature of the optically anisotropic layer 5, the extrapolated glass transition starting temperature was 94° C.

Coating Solution 5 for Optically Anisotropic Layer

| | |
|---|---|
| Liquid crystal compound L-1 shown above | 43.75 parts by mass |
| Liquid crystal compound L-2 shown above | 43.75 parts by mass |
| Polymerizable compound A-4 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

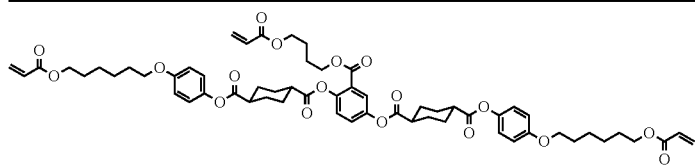

A-4

Example 6

An optically anisotropic layer 6 of Example 6 was formed in the same manner as in Example 1 except that a coating solution 6 for an optically anisotropic layer having the following composition was used that instead of using the coating solution 1 for an optically anisotropic layer in Example 1. As a result of measuring the extrapolated glass transition starting temperature of the optically anisotropic layer 6, the extrapolated glass transition starting temperature was 94° C.

Coating Solution 6 for Optically Anisotropic Layer

| | |
|---|---|
| Liquid crystal compound L-1 shown above | 43.75 parts by mass |
| Liquid crystal compound L-2 shown above | 43.75 parts by mass |
| Polymerizable compound A-5 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

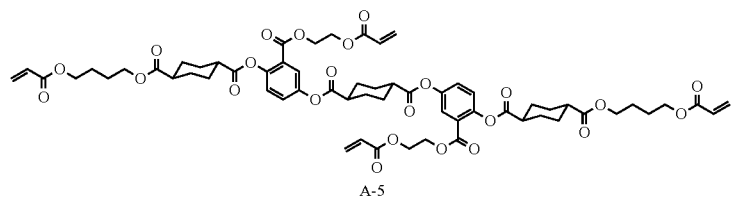

A-5

Example 7

An optically anisotropic layer 7 of Example 7 was formed in the same manner as in Example 1 except that a coating solution 7 for an optically anisotropic layer having the following composition was used instead of the coating solution 1 for an optically anisotropic layer in Example 1. As a result of measuring the extrapolated glass transition starting temperature of the optically anisotropic layer 7, the extrapolated glass transition starting temperature was 93° C.

Coating Solution 7 for Optically Anisotropic Layer

| | |
|---|---|
| Liquid crystal compound L-1 shown above | 43.75 parts by mass |
| Liquid crystal compound L-2 shown above | 43.75 parts by mass |
| Polymerizable compound A-6 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

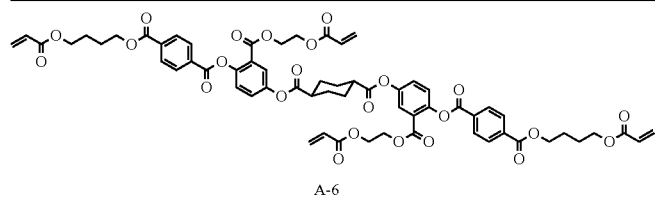

A-6

Example 8

An optically anisotropic layer 8 of Example 8 was formed in the same manner as in Example 1 except that a coating solution 8 for an optically anisotropic layer having the following composition was used instead of the coating solution 1 for an optically anisotropic layer in Example 1, the formed liquid crystal composition layer 8 was aged at 60° C., and in a state of a sematic phase (Ne phase), the alignment was fixed at 60° C. As a result of measuring the extrapolated glass transition starting temperature of the optically anisotropic layer 8, the extrapolated glass transition starting temperature was 81° C.

Coating Solution 8 for Optically Anisotropic Layer

| | |
|---|---|
| Liquid crystal compound L-6 shown below | 87.50 parts by mass |
| Polymerizable compound A-1 shown above | 12.50 parts by mass |
| Polymerization initiator (IRGACURE 184, manufactured by BASF SE) | 3.00 parts by mass |
| Leveling agent (Compound T-1 shown above) | 0.20 parts by mass |
| Methyl ethyl ketone | 219.30 parts by mass |

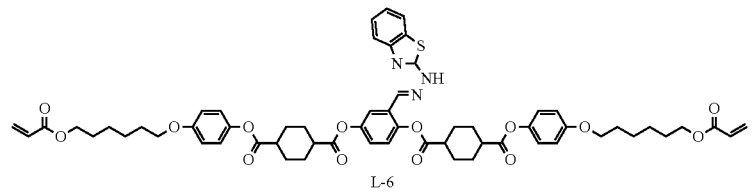 [SMILES: C=CC(=O)OCCCCCCOc1ccc(OC(=O)C2CCC(C(=O)Oc3ccc(OC(=O)C4CCC(C(=O)Oc5ccc(OCCCCCCOC(=O)C=C)cc5)CC4)c(/C=N/NC4Nc5ccccc5S4)c3)CC2)cc1]

L-6

Example 9

An optically anisotropic layer 9 of Example 9 was formed in the same manner as in Example 1 except that a coating solution 9 for an optically anisotropic layer having the following composition was used instead of the coating solution 1 for an optically anisotropic layer in Example 1. As a result of measuring the extrapolated glass transition starting temperature of the optically anisotropic layer 9, the extrapolated glass transition starting temperature was 97° C.

Coating Solution 9 for Optically Anisotropic Layer

| | |
|---|---|
| Liquid crystal compound L-1 shown above | 43.75 parts by mass |
| Liquid crystal compound L-2 shown above | 43.75 parts by mass |
| Polymerizable compound A-8 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

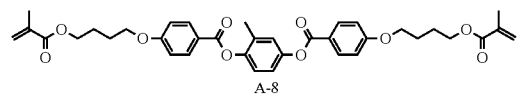

A-8

Example 10

An optically anisotropic layer 10 of Example 10 was formed in the same manner as in Example 1 except that a coating solution 10 for an optically anisotropic layer having the following composition was used instead of the coating solution 1 for an optically anisotropic layer in Example 1. As a result of measuring the extrapolated glass transition starting temperature of the optically anisotropic layer 10, the extrapolated glass transition starting temperature was 95° C.

Coating Solution 10 for Optically Anisotropic Layer

| | |
|---|---|
| Liquid crystal compound L-1 shown above | 43.75 parts by mass |
| Liquid crystal compound L-2 shown above | 43.75 parts by mass |
| Polymerizable compound A-9 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

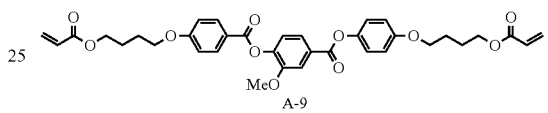

A-9

Example 11

An optically anisotropic layer 11 of Example 11 was formed in the same manner as in Example 1 except that a coating solution 11 for an optically anisotropic layer having the following composition was used instead of the coating solution 1 for an optically anisotropic layer in Example 1. As a result of measuring the extrapolated glass transition starting temperature of the optically anisotropic layer 11, the extrapolated class transition starting temperature was 90° C.

Coating Solution 11 for Optically Anisotropic Layer

| | |
|---|---|
| Liquid crystal compound L-1 shown above | 43.75 parts by mass |
| Liquid crystal compound L-2 shown above | 43.75 parts by mass |
| Polymerizable compound A-17 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

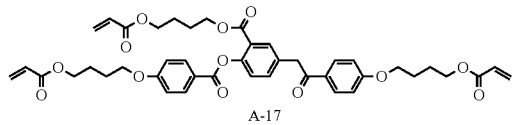 [SMILES: C=CC(=O)OCCCCOC(=O)c1cc(CC(=O)c2ccc(OCCCCOC(=O)C=C)cc2)ccc1OC(=O)c1ccc(OCCCCOC(=O)C=C)cc1 ; "A-17"]

A-17

Example 12

An optically anisotropic layer 12 of Example 12 was formed in the same manner as in Example 1 except that a coating solution 12 for an optically anisotropic layer having the following composition was used instead of the coating solution 1 for an optically anisotropic layer in Example 1. As a result of measuring the extrapolated glass transition starting temperature of the optically anisotropic layer 12, the extrapolated glass transition starting temperature was 95° C.

Coating Solution 12 for Optically Anisotropic Layer

| | |
|---|---|
| Liquid crystal compound L-1 shown above | 43.75 parts by mass |
| Liquid crystal compound L-2 shown above | 43.75 parts by mass |
| Polymerizable compound A-24 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

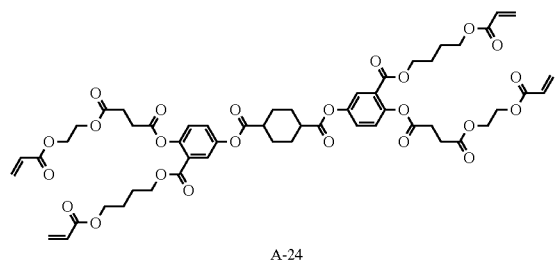 [SMILES: C=CC(=O)OCCCCOC(=O)c1cc(OC(=O)C2CCC(C(=O)Oc3ccc(OC(=O)CCC(=O)OCCOC(=O)C=C)c(C(=O)OCCCCOC(=O)C=C)c3)CC2)ccc1OC(=O)CCC(=O)OCCOC(=O)C=C ; "A-24"]

A-24

Example 13

An optically anisotropic layer 13 of Example 13 was formed in the same manner as in Example 1 except that a coating solution 13 for an optically anisotropic layer having the following composition was used instead of the coating solution 1 for an optically anisotropic layer in Example 1. As a result of measuring the extrapolated glass transition starting temperature of the optically anisotropic layer 13, the extrapolated glass transition starting temperature was 92° C.

Coating Solution 13 for Optically Anisotropic Layer

| | |
|---|---|
| Liquid crystal compound L-1 shown above | 43.75 parts by mass |
| Liquid crystal compound L-2 shown above | 43.75 parts by mass |
| Polymerizable compound A-34 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

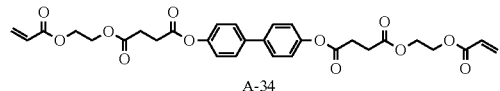 [SMILES: C=CC(=O)OCCOC(=O)CCC(=O)Oc1ccc(-c2ccc(OC(=O)CCC(=O)OCCOC(=O)C=C)cc2)cc1 ; "A-34"]

A-34

Example 14

An optically anisotropic layer 14 of Example 14 was formed in the same manner as in Example 1 except that a coating solution 14 for an optically anisotropic layer having the following composition was used instead of the coating solution 1 for an optically anisotropic layer in Example 1. As a result of measuring the extrapolated glass transition starting temperature of the optically anisotropic layer 14, the extrapolated glass transition starting temperature was 93° C.

Coating Solution 14 for Optically Anisotropic Layer

| | |
|---|---|
| Liquid crystal compound L-1 shown above | 43.75 parts by mass |
| Liquid crystal compound L-2 shown above | 43.75 parts by mass |
| Polyinerizable compound A-36 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

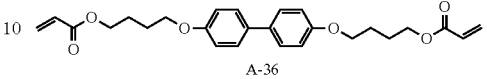

A-36

Example 15

An optically anisotropic layer 15 of Example 15 was formed in the same manner as in Example 1 except that a coating solution 15 for an optically anisotropic layer having the following composition was used instead of the coating solution 1 for an optically anisotropic layer in Example 1. As a result of measuring the extrapolated glass transition starting temperature of the optically anisotropic layer 15, the extrapolated glass transition starting temperature was 95° C.

Coating Solution 15 for Optically Anisotropic Layer

| | |
|---|---|
| Liquid crystal compound L-1 shown above | 43.75 parts by mass |
| Liquid crystal compound L-2 shown above | 43.75 parts by mass |
| Polymerizable compound A-37 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

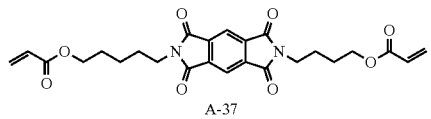 [SMILES: C=CC(=O)OCCCCCn1c(=O)c2cc3c(=O)n(CCCCOC(=O)C=C)c(=O)c3cc2c1=O ; "A-37"]

A-37

Comparative Example 1

An optically anisotropic layer C1 of Comparative Example 1 was formed in the same manner as in Example 1 except that a coating solution C1 for an optically anisotropic layer having the following composition was used instead of the coating solution 1 for an optically anisotropic layer in Example 1 and the temperature at the time of ultraviolet irradiation for fixing the alignment was changed to 35° C. As a result of measuring the extrapolated glass transition starting temperature of the optically anisotropic layer C1, the extrapolated glass transition starting temperature was 61° C.

Coating Solution C1 for Optically Anisotropic Layer

| | |
|---|---|
| Liquid crystal compound L-1 shown above | 43.60 parts by mass |
| Liquid crystal compound L-2 shown above | 43.60 parts by mass |
| Polymerizable compound A-1 shown above | 12.50 parts by mass |
| Polymerization initiator (IRGACURE 184, manufactured by BASF SE) | 6.00 parts by mass |
| Leveling agent (Compound T-1 shown above) | 0.20 parts by mass |
| Methyl ethyl ketone | 225.68 parts by mass |

Comparative Example 2

An optically anisotropic layer C2 of Comparative Example 2 was formed in the same manner as in Example 1 except that a coating solution C2 for an optically anisotropic layer having the following composition was used instead of the coating solution 1 for an optically anisotropic layer in Example 1, a liquid crystal composition layer to be formed was aged at 60° C., and the alignment was fixed at 60° C. in a state of a nematic phase (No phase). As a result of measuring the extrapolated glass transition starting temperature of the optically anisotropic layer C2, the extrapolated glass transition starting temperature was 65° C.

Coating Solution C2 for Optically Anisotropic Layer

| | |
|---|---|
| Polymerizable compound A-42 shown below | 80.00 parts by mass |
| Polymerizable compound A-43 shown below | 20.00 pails by mass |
| Polymerization initiator (IRGACURE 907, manufactured by BASF SE) | 3.00 parts by mass |
| Polymerization initiator S-3 shown below | 1.00 part by mass |
| Leveling agent (Compound T-1 shown above) | 0.20 parts by mass |
| Compound T-2 shown below | 8.00 parts by mass |
| Methyl ethyl ketone | 285.40 parts by mass |
| Anon | 47.60 parts by mass |

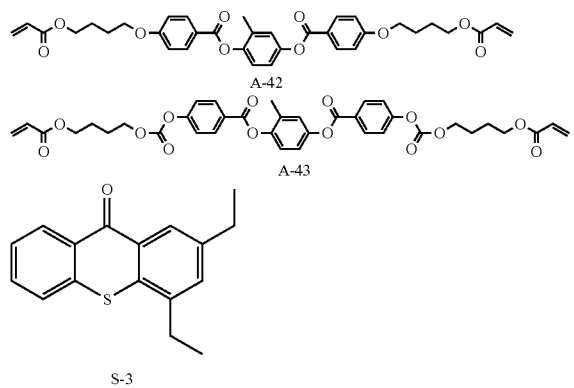

A-42

A-43

S-3

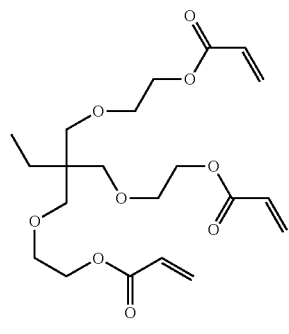

T-2

Comparative Example 3

An optically anisotropic layer C3 of Comparative Example 3 was formed in the same manner as in Example 1 except that a coating solution C3 for an optically anisotropic layer having the following composition was used instead of the coating solution 1 for an optically anisotropic layer in Example 1. As a result of measuring the extrapolated glass transition starting temperature of the optically anisotropic layer C3, the extrapolated glass transition starting temperature was 68° C.

Coating Solution C3 for Optically Anisotropic Layer

| | |
|---|---|
| Liquid crystal compound L-1 shown above | 43.75 parts by mass |
| Liquid crystal compound L-2 shown above | 43.75 parts by mass |
| Polymerizable compound A-5 shown above | 12.50 parts by mass |
| Polymerization initiator (IRGACURE 819, manufactured by BASF SE) | 3.00 parts by mass |
| Leveling agent (Compound T-1 shown above) | 0.20 parts by mass |
| Methyl ethyl ketone | 219.30 parts by mass |

<Durability>

The optical film prepared in each of Examples and Comparative Examples was attached to a glass plate with a pressure sensitive adhesive such that the optically anisotropic layer side became the glass side.

The durability of the retardation value was evaluated based on the following standards using Axo Scan (OPMF-1, manufactured by Axometrics Inc.). The results are shown in Table 1 below.

Regarding the test conditions, as shown in Table 1 below, a test in which the optical film was left to stand in an environment at 60° C. and a relative humidity of 90% for 1,000 hours and a test in which optical film was left to stand in an environment at 85° C. and a relative humidity of 85% for 120 hours were conducted. In addition, in the test in which the optical film is left to stand in an environment at 60° C. and a relative humidity of 90% for 1,000 hours, in a case in which the optical film is evaluated as "A", the durability can be determined to be satisfactory.

A: A change amount of the value after test with respect to the initial phase difference value is less than 2%.

B: A change amount of the value after test with respect to the initial phase difference value is 2% or more and less than 10%.

C: A change amount of the value after test with respect to the initial phase difference value is 10% or more.

From the comparison of Example 1 and Examples 2 to 7, it was found that in a case in which the polymerizable initiator was of an oxime type, the durability was more satisfactory.

From the comparison of Examples 1 and 2 and Examples 3 to 7, it was found that in a case in which the number of polymerizable groups of the polymerizable compound formulated in addition to the liquid crystal compound was 2 to 4, the durability was more satisfactory.

TABLE 1

|  | Number of functional groups of polymerizable compound | Alignment fixation temperature [° C.] | Alignment state | Re(450)/Re(550) | Extrapolated glass transition starting temperature [° C.] | 60° C. Relative humidity 90% 1,000 hours | 85° C. Relative humidity 85% 120 hours |
|---|---|---|---|---|---|---|---|
| Example 1 | 1 | 60 | SmA | 0.86 | 74 | A | C |
| Example 2 | 1 | 60 | SmA | 0.86 | 82 | A | B |
| Example 3 | 2 | 60 | SmA | 0.87 | 96 | A | A |
| Example 4 | 2 | 60 | SmA | 0.88 | 95 | A | A |
| Example 5 | 3 | 60 | SmA | 0.88 | 94 | A | A |
| Example 6 | 4 | 60 | SmA | 0.87 | 92 | A | A |
| Example 7 | 4 | 60 | SmA | 0.88 | 93 | A | A |
| Example 8 | 1 | 60 | Ne | 0.86 | 81 | A | C |
| Example 9 | 2 | 60 | SmA | 0.89 | 97 | A | A |
| Example 10 | 2 | 60 | SmA | 0.9 | 95 | A | A |
| Example 11 | 3 | 60 | SmA | 0.88 | 90 | A | A |
| Example 12 | 4 | 60 | SmA | 0.86 | 95 | A | A |
| Example 13 | 2 | 60 | SmA | 0.89 | 92 | A | A |
| Example 14 | 2 | 60 | SmA | 0.87 | 93 | A | A |
| Example 15 | 2 | 60 | SmA | 0.86 | 95 | A |  |
| Comparative Example 1 | 1 | 35 | SmA | 0.86 | 61 | B | C |
| Comparative Example 2 | — | 60 | Ne | 1.09 | 65 | A | B |
| Comparative Example 3 | 1 | 60 | SmA | 0.86 | 68 | B | C |

From the results shown in Table 1, it was found that in a case in which although the composition contained the liquid crystal compound represented by Formula (1), the extrapolated glass transition starting temperature of the optically anisotropic layer was lower than 70° C., the durability was deteriorated (Comparative Examples 1 and 3). It was found that in a case in which the composition contained a liquid crystal compound not corresponding to Formula (1) and having a structure in which benzene rings (phenylene groups) are linked through an ester bond, the durability was satisfactory and there was no problem (Comparative Example 2).

In contrast, it was found that in a case in which although the composition contained the liquid crystal compound represented by Formula (1), the extrapolated glass transition starting temperature of the optically anisotropic layer was set to 70° C. or higher, the durability was satisfactory in all examples (Examples 1 to 15).

Particularly, from the comparison of Examples 1 to 7 and Example 8, it was found that in a case of using the optically anisotropic layer obtained by aligning the polymerizable liquid crystal composition in a smectic, phase and then carrying out polymerization, the durability was more satisfactory.

From the comparison of Examples 1 to 7, it was found that in a case in which the extrapolated glass transition starting temperature of the optically anisotropic layer was 80° C. or higher, the durability more satisfactory, and in a case in which the extrapolated glass transition starting temperature of the optically anisotropic layer was 90° C. or higher, the durability was still more satisfactory.

EXPLANATION OF REFERENCES

10: optical film

12: optically anisotropic layer

14: alignment film

16: support

18: hard coat layer

What is claimed is:

1. An optical film comprising, at least:

an optically anisotropic layer, wherein the optically anisotropic layer is a layer obtained by polymerizing a polymerizable liquid crystal composition containing a liquid crystal compound represented by Formula (1) and a polymerization initiator, wherein the polymerization initiator is an oxime type polymerization initiator, wherein the polymerizable liquid crystal composition contains one or two kinds of liquid crystal compounds represented by Formula (1) and other polymerizable compounds having 2 to 4 polymerizable groups, an extrapolated glass transition starting temperature of the optically anisotropic layer is 90° C. or higher, and wherein the optically anisotropic layer satisfies Expression (I),

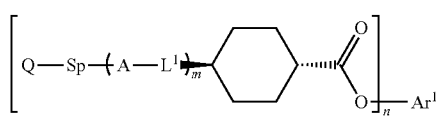

in Formula (1),

Ar¹ represents an n-valent aromatic group,

L¹ represents a single bond, —COO—, or —OCO—,

A represents an aromatic ring having 6 or more carbon atoms or a cycloalkylene ring having 6 or more carbon atoms, Sp represents a single bond, a linear or branched alkylene group having 1 to 12 carbon atoms, or a divalent linking group in which one or more —$CH_2$— groups that constitute a linear or branched alkylene group having 1 to 12 carbon atoms are substituted with —O—, —S—, —NH—, —N(Q)-, or —CO—, Q represents a polymerizable group, m represents an integer of 0 to 2, and n represents an integer of 1 or 2, where all of L, A, Sp, and Q, a plurality of which are provided depending on the number of m or n, may be the same or different from each other, $0.75 \leq Re(450)/Re(550) \leq 1.00$ ... (I)

in Expression (I), Re(450) represents an in-plane retardation of the optically anisotropic layer at a wavelength of 450 nm, and Re(550) represents an in-plane retardation of the optically anisotropic layer at a wavelength of 550 nm.

2. The optical film according to claim 1,
wherein the optically anisotropic layer is a layer obtained by polymerizing the polymerizable liquid crystal composition after aligning the polymerizable liquid crystal composition in a smectic phase.

3. A polarizing plate comprising:
the optical film according to claim 1; and
a polarizer.

4. A polarizing plate comprising:
the optical film according to claim 2; and
a polarizer.

5. An image display device comprising:
the optical film according to claim 1.

6. An image display device comprising:
the optical film according to claim 2.

7. An image display device comprising:
the optical film according to claim 3.

8. The optical film according to claim 1,
wherein the polymerizable compound is a liquid crystal compound exhibiting forward wavelength dispersion.

9. The optical film according to claim 1,
wherein the polymerizable compound is a compound represented by any one of Formulae A-2 to A-27 and A-29 to A-43

A-2

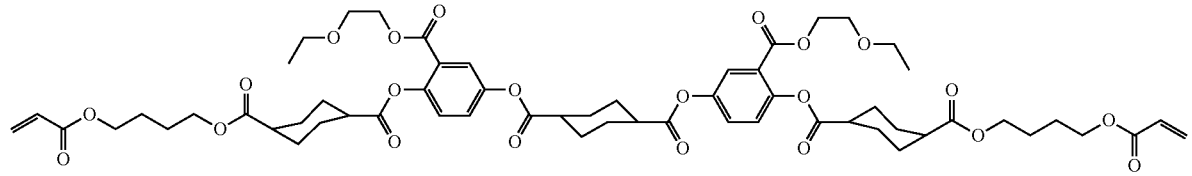

A-3

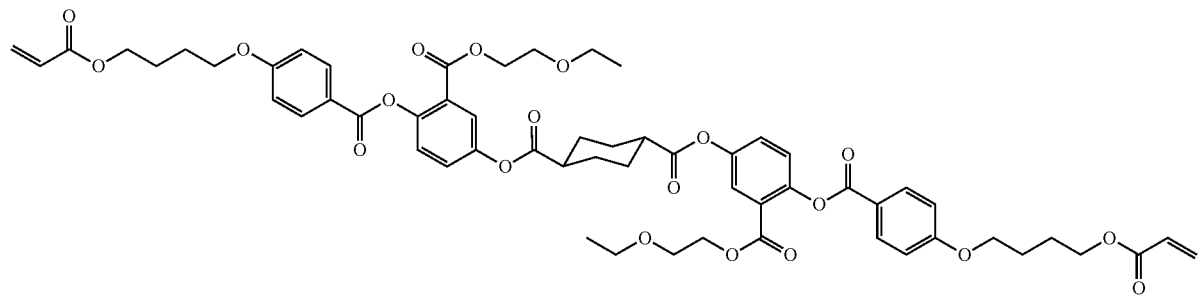

A-4

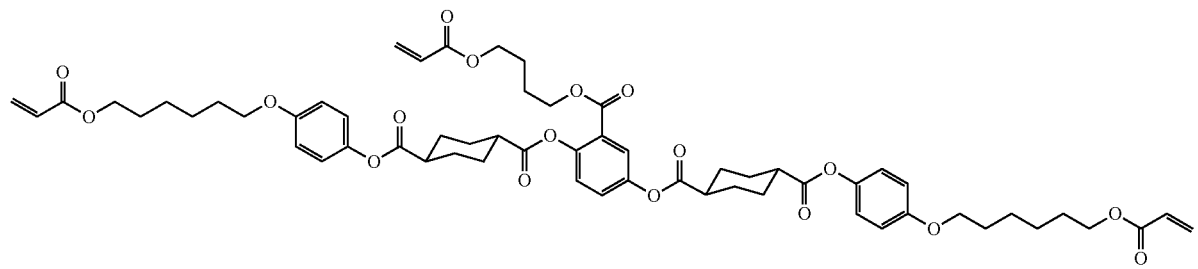

-continued
A-5
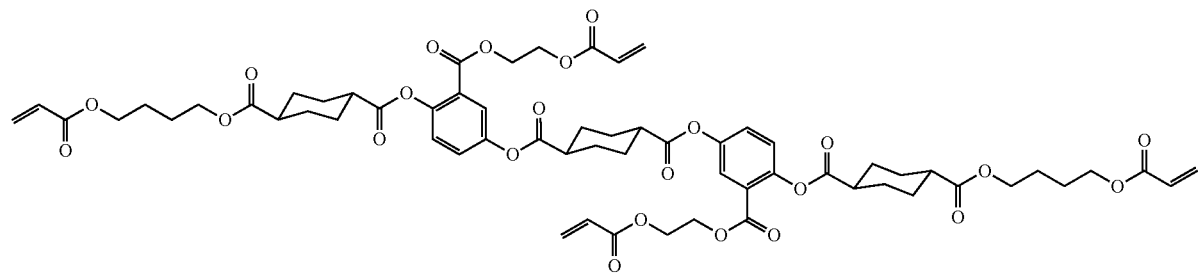
A-6
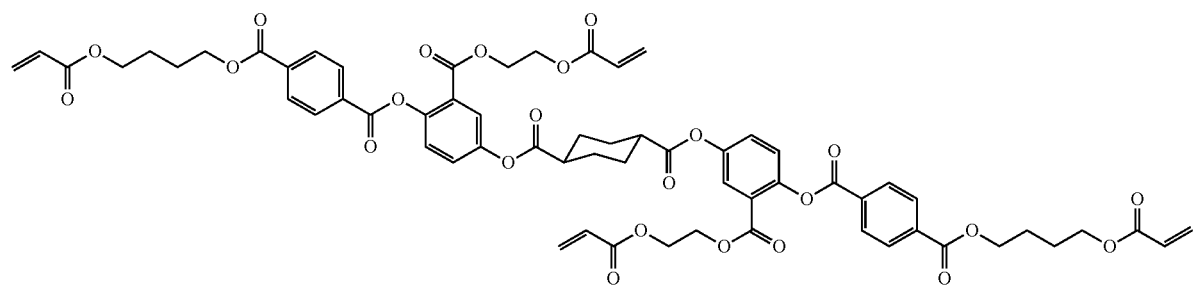
A-7
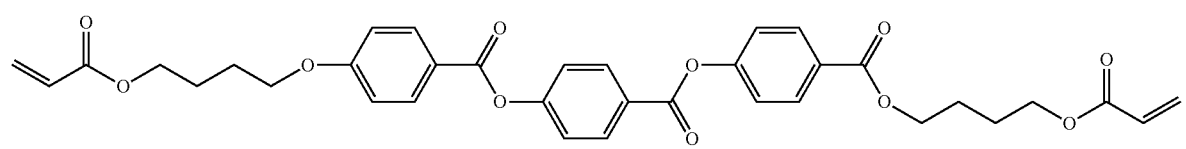
A-8
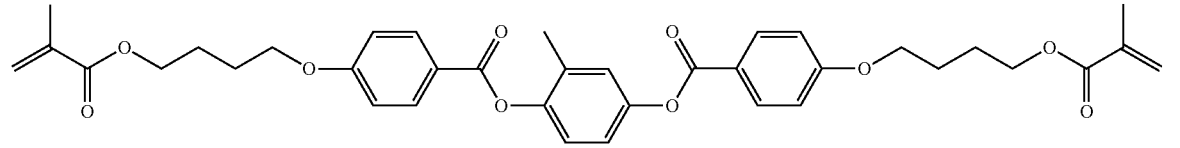
A-9
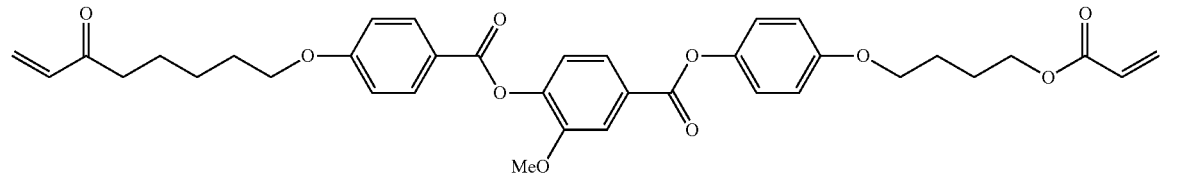
A-10
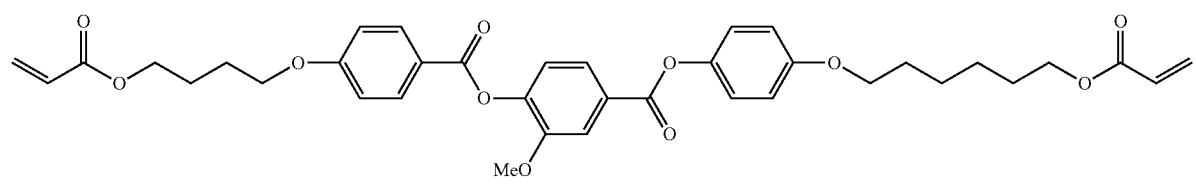
A-11
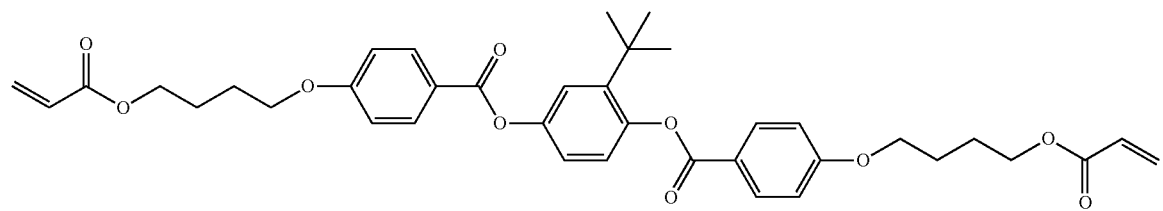

-continued
A-12
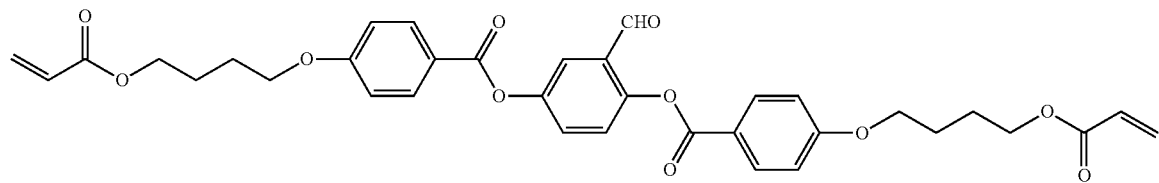
A-13
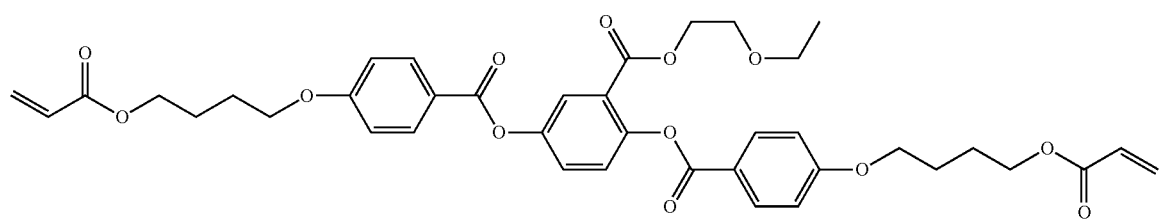
A-14
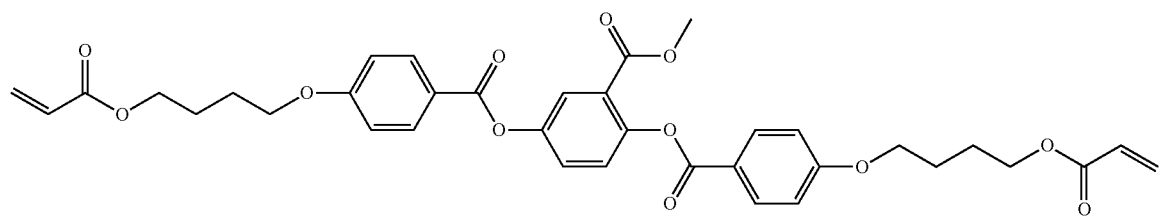
A-15
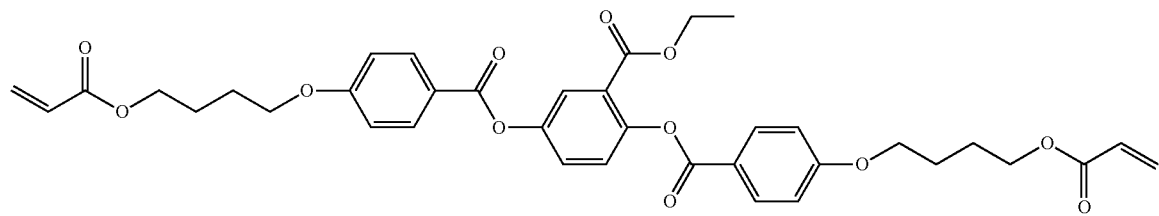
A-16
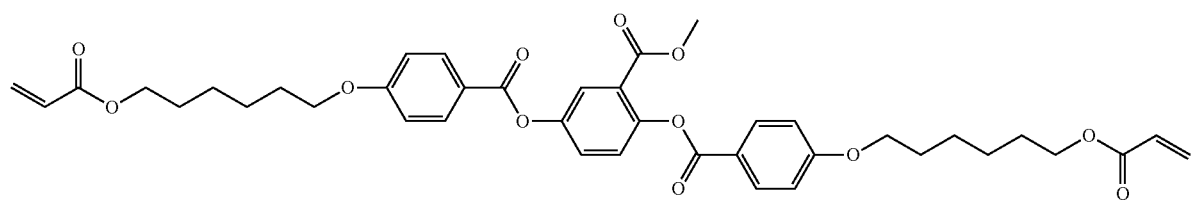
A-17
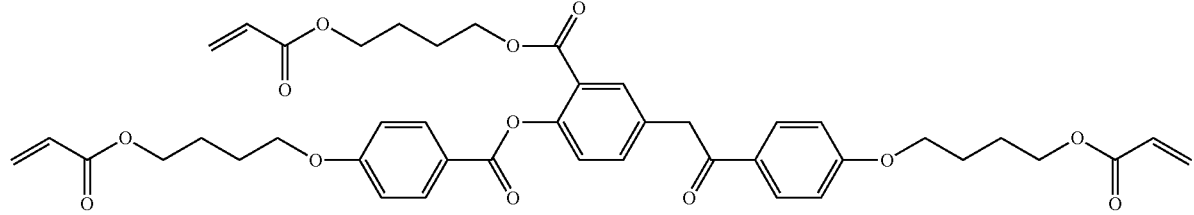
A-18
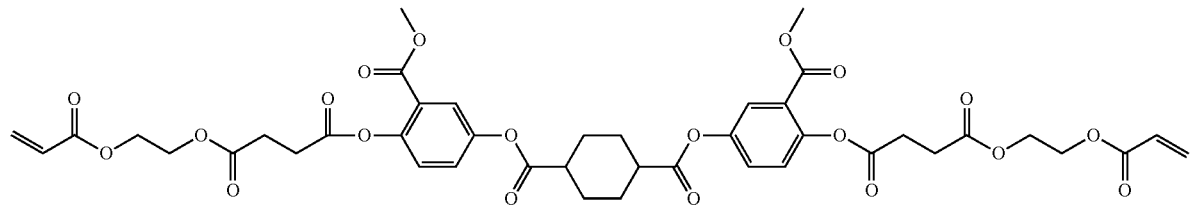

A-19
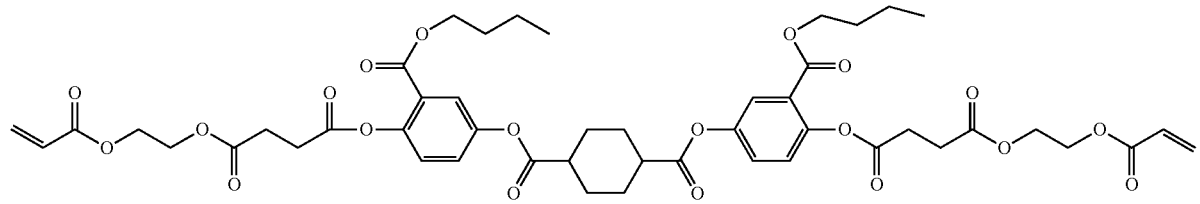
A-20
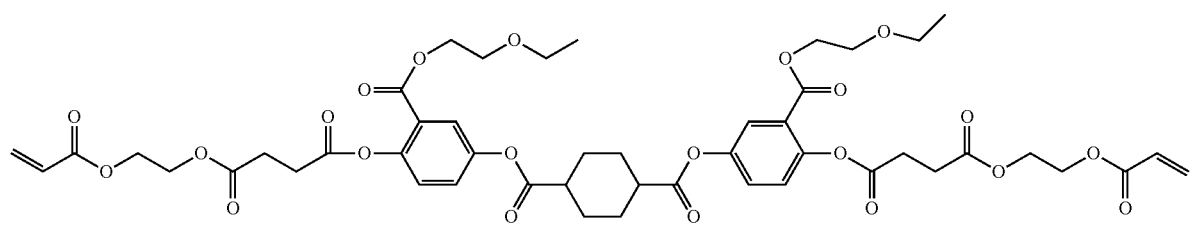
A-21
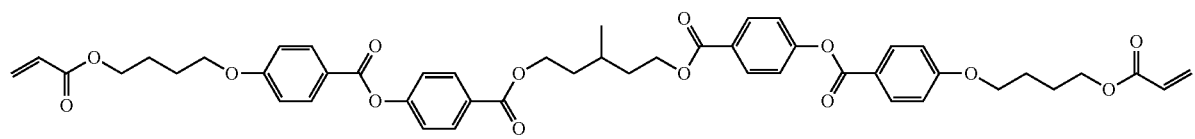
A-22
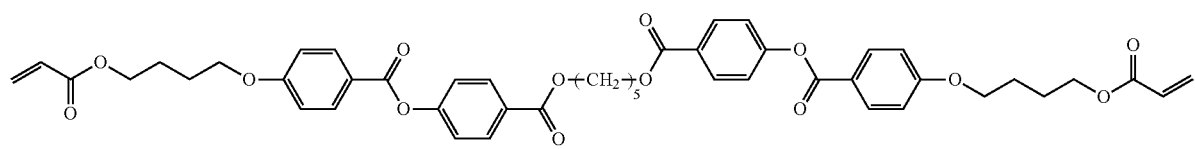
A-23
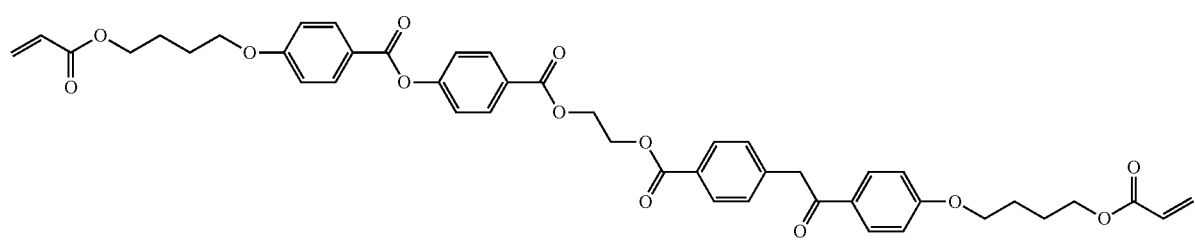
A-24
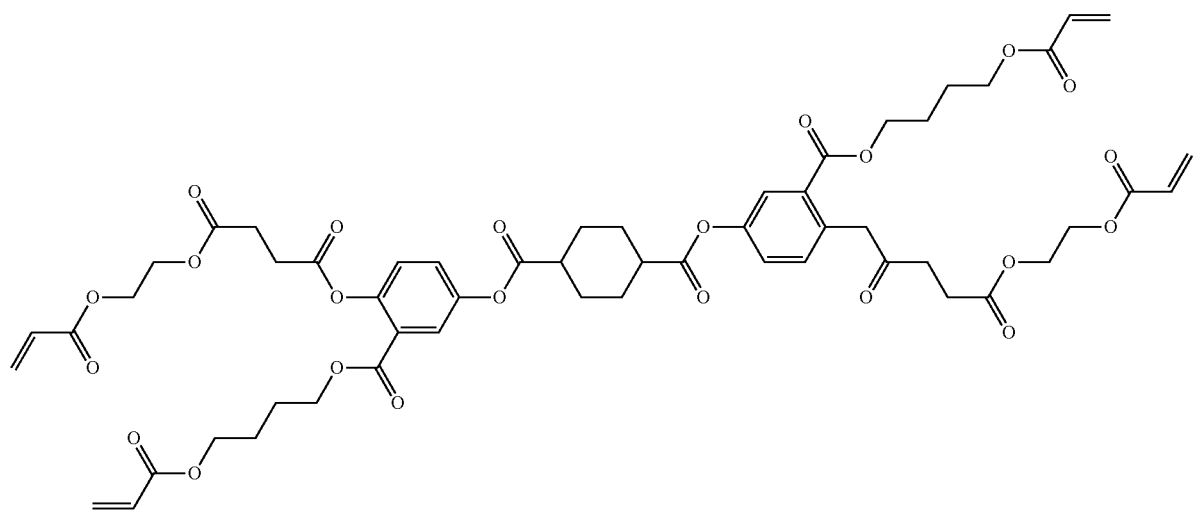

-continued
A-25
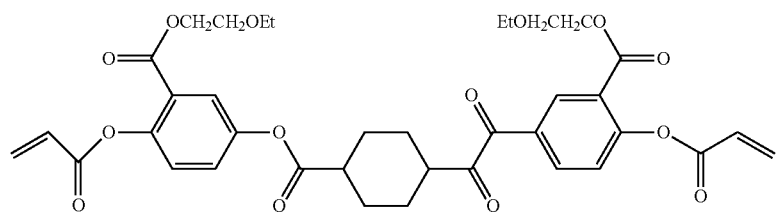
A-26
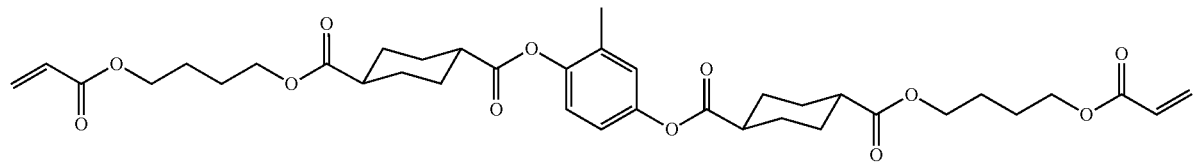
A-27
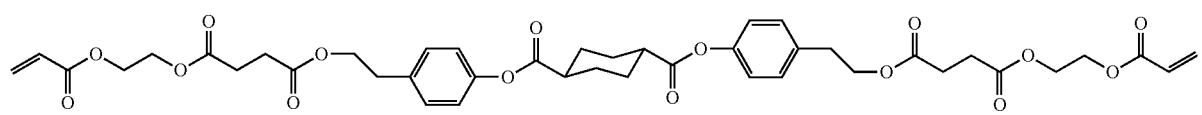
A-29
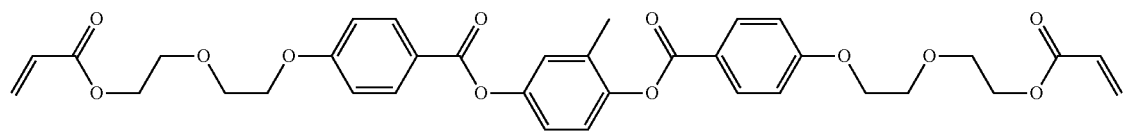
A-30
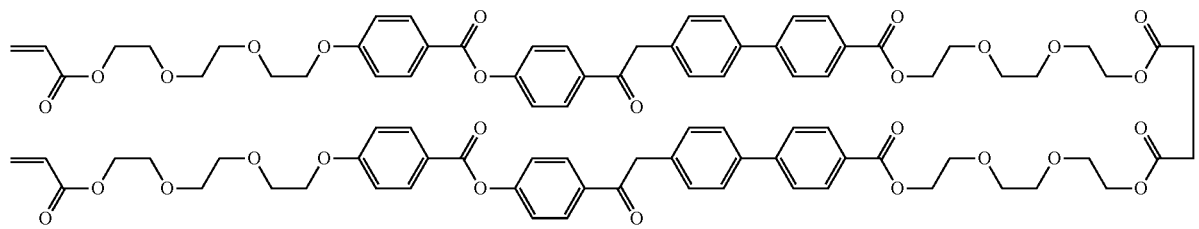
A-31
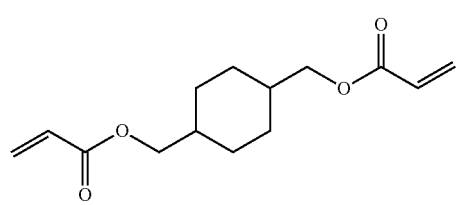
A-32
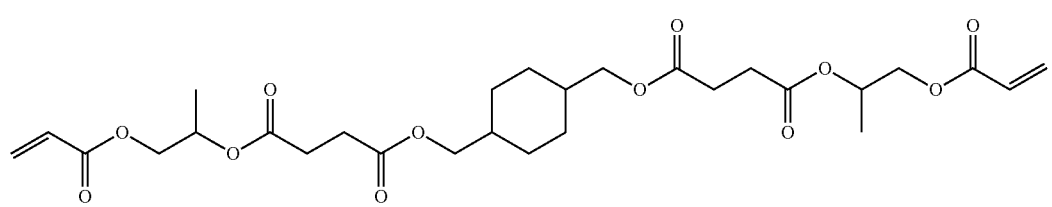
A-33
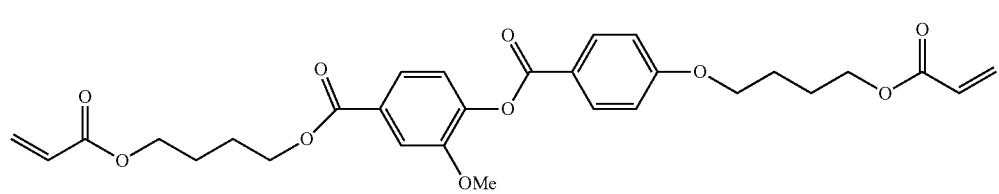

-continued
A-34
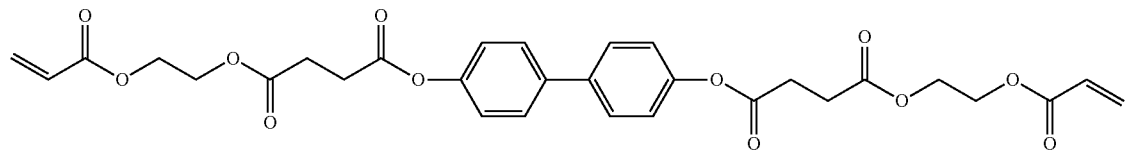
A-35
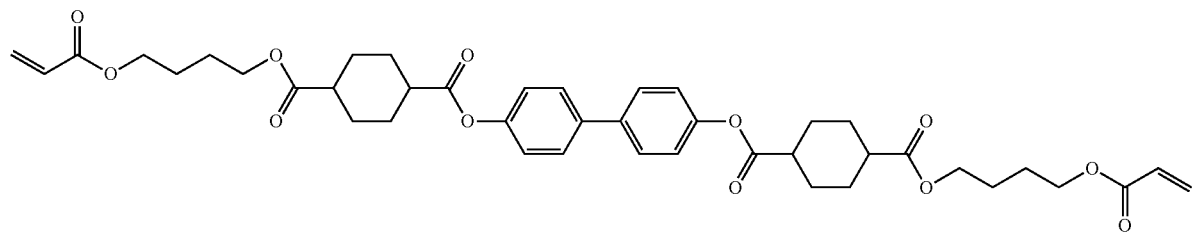
A-36
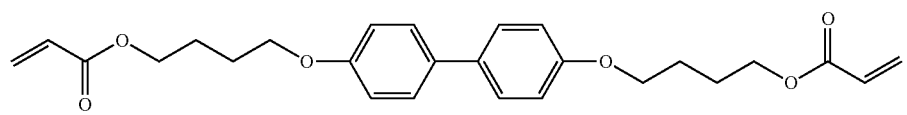
A-37
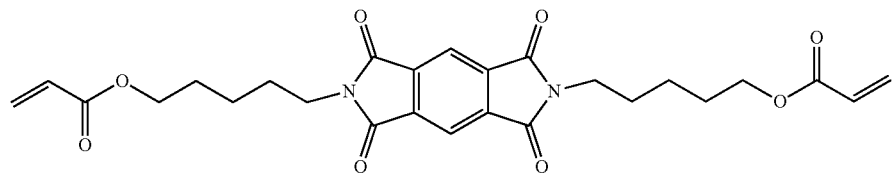
A-38
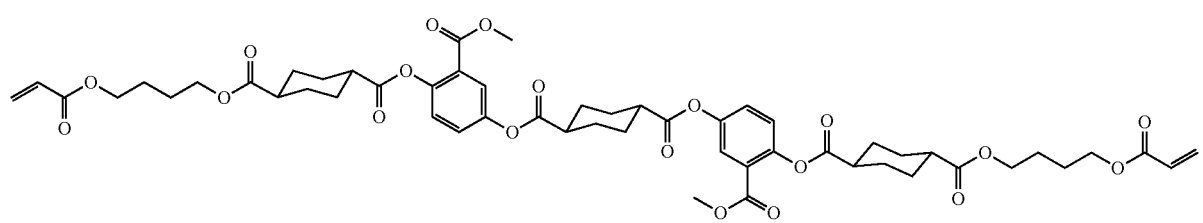
A-39
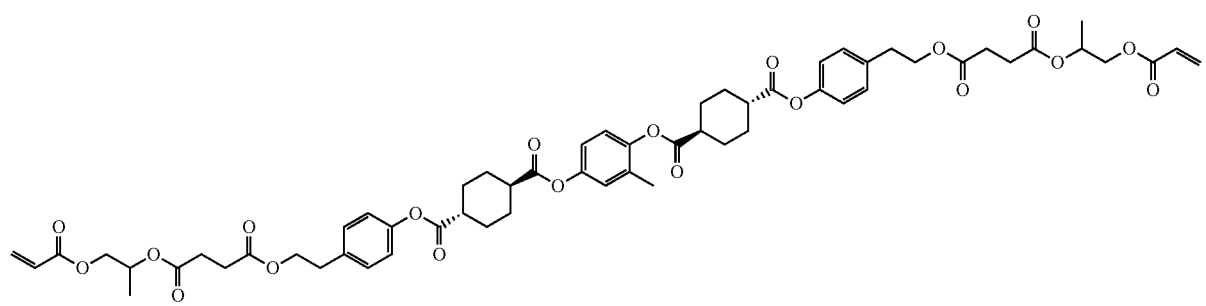
A-40
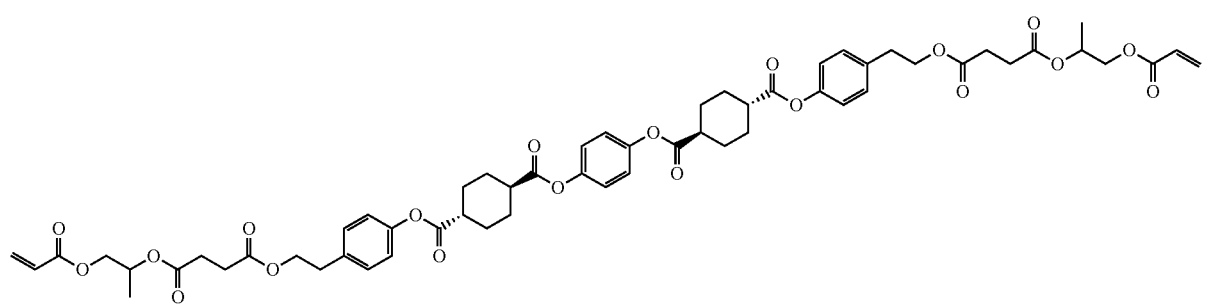

-continued
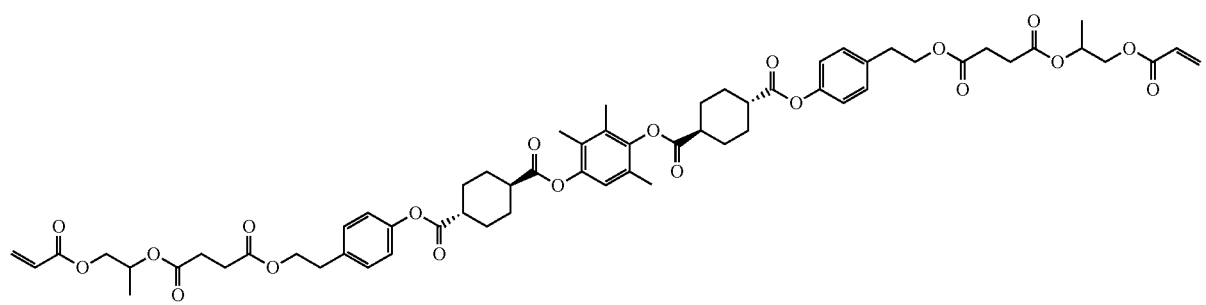
A-41
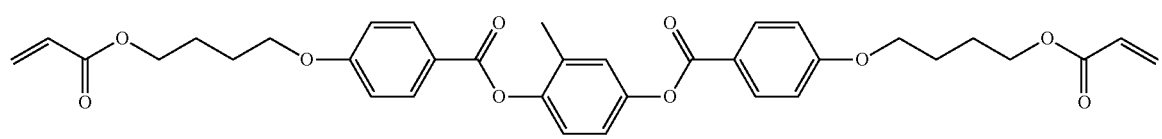
A-42
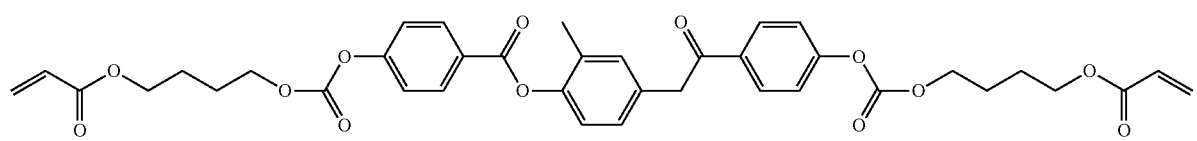
A-43
* * * * *